(12) United States Patent
Chen et al.

(10) Patent No.: US 12,190,583 B2
(45) Date of Patent: Jan. 7, 2025

(54) USER TAG GENERATION METHOD AND APPARATUS, STORAGE MEDIUM, AND COMPUTER DEVICE

(71) Applicant: Tencent Technology (Shenzhen) Company Limited, Shenzhen (CN)

(72) Inventors: Xin Chen, Shenzhen (CN); Su Yan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 909 days.

(21) Appl. No.: 17/321,226

(22) Filed: May 14, 2021

(65) Prior Publication Data

US 2021/0271975 A1    Sep. 2, 2021

Related U.S. Application Data

(63) Continuation of application No. PCT/CN2020/079445, filed on Mar. 16, 2020.

(30) Foreign Application Priority Data

Apr. 10, 2019  (CN) .......................... 201910284354.6

(51) Int. Cl.
*G06V 20/40* (2022.01)
*G06F 18/213* (2023.01)
(Continued)

(52) U.S. Cl.
CPC ............ *G06V 20/40* (2022.01); *G06F 18/213* (2023.01); *G06N 3/04* (2013.01); *G06N 3/08* (2013.01);
(Continued)

(58) Field of Classification Search
CPC .......... G06V 20/40; G06F 15/16; A61B 5/055
(Continued)

(56) References Cited

U.S. PATENT DOCUMENTS 8,285,658 B1 * 10/2012 Kellas-Dicks ........ G06F 21/316
706/45
10,503,933 B2 * 12/2019 Auh ...................... H04L 9/0643
(Continued)

FOREIGN PATENT DOCUMENTS

CN       104602042 A     5/2015
CN       105701161 A     6/2016
(Continued)

OTHER PUBLICATIONS

Tencent Technology (Shenzhen) Company Limited, JP2021528428, Decision to Grant a Patent, Jun. 27, 2022, 5 pgs.
(Continued)

*Primary Examiner* — Ruay Ho
(74) *Attorney, Agent, or Firm* — Morgan, Lewis & Bockius LLP

(57) ABSTRACT

This application relates to a user tag generation method performed by a computer device, relating to the field of neural networks. The method includes: obtaining discrete user data corresponding to a target user identifier in multiple feature fields respectively; for each feature field, obtaining an intra-field feature corresponding to the target user identifier according to the discrete user data in the feature field; merging the intra-field features to obtain an inter-field feature corresponding to the target user identifier; performing feature crossing on sub-features in the inter-field feature to obtain a cross feature corresponding to the target user identifier; and selecting, from candidate user tags, a target user tag corresponding to the target user identifier according to the inter-field feature and the cross feature. The solutions (Continued)

provided by this application can improve the accuracy of generating user tags.

17 Claims, 7 Drawing Sheets

(51) Int. Cl.
  *G06N 3/04* (2023.01)
  *G06N 3/08* (2023.01)
  *G06V 10/80* (2022.01)
  *G06F 18/21* (2023.01)
  *G06V 40/20* (2022.01)
(52) U.S. Cl.
  CPC ........ *G06V 10/806* (2022.01); *G06F 18/2193* (2023.01); *G06V 40/20* (2022.01)
(58) Field of Classification Search
  USPC ........................................ 706/11, 12, 21, 45
  See application file for complete search history.

(56) References Cited

U.S. PATENT DOCUMENTS

| | | | | |
|---|---|---|---|---|
| 11,803,127 | B2* | 10/2023 | Lin | G03F 7/70616 |
| 2014/0046878 | A1* | 2/2014 | Lecomte | G06F 18/23213 |
| | | | | 706/12 |
| 2014/0143186 | A1* | 5/2014 | Bala | G16B 40/30 |
| | | | | 706/12 |
| 2014/0344191 | A1* | 11/2014 | Lebow | G06N 5/02 |
| | | | | 706/11 |
| 2019/0102693 | A1 | 4/2019 | Yates et al. | |
| 2021/0228786 | A1* | 7/2021 | Perry | A61M 1/92 |

FOREIGN PATENT DOCUMENTS

| | | | | |
|---|---|---|---|---|
| CN | 107609116 | A | 1/2018 | |
| CN | 109345302 | A | 2/2019 | |
| CN | 110263265 | A | 9/2019 | |
| EP | 3556098 | B1 * | 10/2023 | ........... H04N 19/103 |
| JP | 2018101324 | A | 6/2018 | |
| JP | 2018128942 | A | 8/2018 | |
| WO | WO-2015189407 | A1 * | 12/2015 | ............. A61B 5/055 |
| WO | WO-2017084016 | A1 * | 5/2017 | ............. G06F 15/16 |
| WO | WO 2019047672 | A1 | 3/2019 | |

OTHER PUBLICATIONS

Tencent Technology, WO, PCT/CN2020/079445, Jun. 15, 2020, 4 pgs.
Tencent Technology, IPRP, PCT/CN2020/079445, Sep. 28, 2021, 5 pgs.
Tencent Technology, ISR, PCT/CN2020/079445, Jun. 15, 2020, 2 pgs.

* cited by examiner

USER TAG GENERATION METHOD AND APPARATUS, STORAGE MEDIUM, AND COMPUTER DEVICE

CROSS-REFERENCE TO RELATED APPLICATIONS

This application is a continuation application of PCT Patent Application No. PCT/CN2020/079445, entitled "METHOD AND APPARATUS FOR GENERATING USER TAG, STORAGE MEDIUM AND COMPUTER DEVICE" filed on Mar. 16, 2020, which claims priority to Chinese Patent Application No. 201910284354.6, filed with the State Intellectual Property Office of the People's Republic of China on Apr. 10, 2019, and entitled "USER TAG GENERATION METHOD AND APPARATUS, STORAGE MEDIUM, AND COMPUTER DEVICE", all of which are incorporated herein by reference in their entirety.

FIELD OF THE TECHNOLOGY

This application relates to the field of neural networks, and in particular, to a user tag generation method and apparatus, a storage medium, and a computer device.

BACKGROUND OF THE DISCLOSURE

With the development of computer technologies, people are increasingly relying on the Internet to obtain various aspects of information. To recommend various useful information to users in time and avoid recommending useless information as much as possible, a target group to receive information is usually determined according to user tags of users.

However, a manner of generating user tags is mainly construction based on statistical user profiles. In this manner, it is difficult to accurately determine sparse behaviors and find information in which users are really interested. As a result, the accuracy of obtained user tags is low.

SUMMARY

Embodiments of this application provide a user tag generation method and apparatus, a storage medium, and a computer device, to effectively improve the accuracy of generating user tags. The technical solutions are as follows.

A user tag generation method is provided, applicable to a computer device, the method including:
  obtaining discrete user data corresponding to a target user identifier in multiple feature fields respectively;
  for each feature field, obtaining an intra-field feature corresponding to the target user identifier according to the discrete user data in the feature field;
  merging the intra-field features to obtain an inter-field feature corresponding to the target user identifier;
  performing feature crossing on sub-features in the inter-field feature to obtain a cross feature corresponding to the target user identifier; and
  selecting, from candidate user tags, a target user tag corresponding to the target user identifier according to the inter-field feature and the cross feature.

A user tag generation apparatus is provided, disposed in a terminal, the apparatus including:
  an obtaining module, configured to obtain discrete user data corresponding to a target user identifier in multiple feature fields respectively;
  a merge module, configured to: for each feature field, obtain an intra-field feature corresponding to the target user identifier according to the discrete user data in the feature field and merge the intra-field features to obtain an inter-field feature corresponding to the target user identifier;
  a crossing module, configured to perform feature crossing on sub-features in the inter-field feature to obtain a cross feature corresponding to the target user identifier; and
  a selection module, configured to select, from candidate user tags, a target user tag corresponding to the target user identifier according to the inter-field feature and the cross feature.

A non-transitory computer-readable storage medium, storing a plurality of computer programs that, when executed by a processor of a computer device, cause the computer device to perform the operations of the foregoing user tag generation method.

A computer device, including a memory and a processor, the memory storing a plurality of computer programs that, when executed by the processor, cause the computer device to perform the operations of the foregoing user tag generation method.

Beneficial effects brought by the technical solutions provided in the embodiments of this application are at least as follows:

After discrete user data corresponding to a target user identifier in multiple feature fields respectively is obtained, in an aspect, the discrete user data is merged in the feature fields and between the feature fields, so that sparse behaviors can be adequately merged to obtain an inter-field feature that merges various sparse behaviors. In another aspect, crossing is performed on sub-features in the inter-field feature, so that the sub-features can be adequately merged to obtain a cross feature that merges the sub-features in the inter-field feature. The inter-field feature merges various sparse behaviors, and the cross feature merges the sub-features in the inter-field feature. Therefore, a target user tag corresponding to the target user identifier is selected from candidate user tags according to the inter-field feature and the cross feature, so that the accuracy of generating user tags can be effectively improved.

DESCRIPTION OF EMBODIMENTS

To make the objectives, technical solutions, and advantages of this application clearer, the following further describes this application in detail with reference to the accompanying drawings and the embodiments. The embodiments described herein are only used for explaining this application, and are not used for limiting this application.

Figure 1:
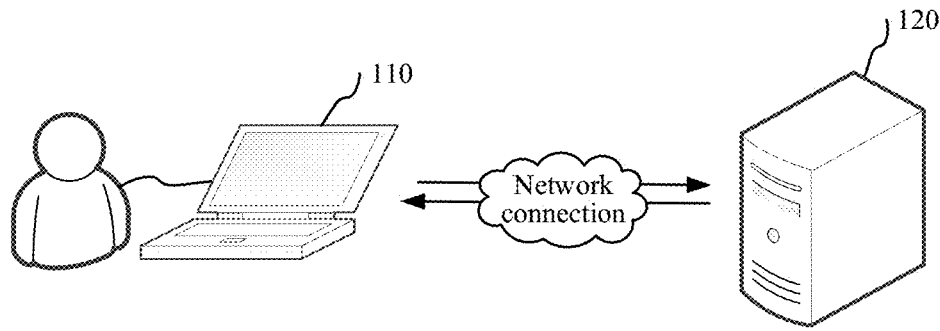
FIG. 1 is a diagram of an application environment of a user tag generation method according to an embodiment.

FIG. 1 is a diagram of an application environment of a user tag generation method according to an embodiment. Referring to FIG. 1, the user tag generation method is applied to a user tag generation system. The user tag generation system includes a terminal 110 and a server 120. The terminal 110 and the server 120 are connected by a network. The terminal 110 may be a desktop terminal or a mobile terminal, and the mobile terminal may be at least one of a mobile phone, a tablet computer, a notebook computer, and the like. The server 120 may be implemented by using an independent server or a server cluster that includes a plurality of servers. Both the terminal 110 and the server 120 may be used independently to perform the user tag generation method provided in the embodiments of this application. Both the terminal 110 and the server 120 may be alternatively used in cooperation to perform the user tag generation method provided in the embodiments of this application.

The embodiments of this application are technical solutions used for generating a user tag for a corresponding user. The user tag may be a label that can be used for effectively reflecting a characteristic of a user or a similarity between users. For example, the user tag may be horror, seafood, comedy or digital. The user tag may be a label for content in which a user is interested or a label for content in which a user is not interested.

In an embodiment, a computer device may generate a target user tag of a target user by using a machine learning model. The machine learning model first generates an inter-field feature and a cross feature of the target user based on discrete feature data of the target user, and then selects the target user tag of the target user from candidate user tags included in a user tag pool based on the inter-field feature and the cross feature. The computer device may alternatively merge the inter-field feature and the cross feature to obtain a target feature that ultimately reflects user characteristics, and then select the target user tag of the target user from the user tag pool based on the target feature.

First, the discrete feature data of the target user may be obtained from multiple feature fields. The feature fields are fields to which user data of different attributes belongs, for example, an age field, a gender field, a video field, and an image-text field. In this case, features are generated based on the discrete feature data from multiple feature fields, so that data sources of generating features may be expanded as much as possible, to obtain features that actually reflect user characteristics. When the machine learning model generates features of the target user based on the discrete feature data of the target user, an intra-field feature in each feature field is first obtained according to the discrete user data in the feature field, the intra-field features are then merged to obtain an inter-field feature, and feature crossing is then performed on sub-features in the inter-field feature to obtain the cross feature, so that an inter-field feature that merges various sparse behaviors (A sparse behavior is a behavior with a tiny quantity generated by a user in a feature field. For example, a user browses 1000 pieces of entertainment news, and browses only 10 pieces of financial news. In this case, the behavior of browsing 10 pieces of financial news is a sparse behavior.) and a cross feature that merges the sub-features in the inter-field feature can be obtained, and the target user tag corresponding to the target user identifier may further be selected from the candidate user tags according to the inter-field feature and the cross feature, thereby effectively improving the accuracy of generating user tags.

In addition, each user has one or more corresponding user tags. The user tag(s) may be considered as a portrait of features of the user's actual interest and an actual comprehensive model of the user. The one or more user tags corresponding to the user may be referred to as a user profile of the user. Based on the user profile, the computer device may make information recommendation in various fields for the users. For example, the computer device makes news recommendation in a news application, video recommendation in a video application, article recommendation in a social application, and promotion information recommendation in various applications. For example, in a scenario of news recommendation, user tags generated for the target user based on the technical solutions in the embodiments of this application are entertainment and finance, and entertainment news and financial news may be recommended to the target user. In this way, the computer device may still perform accurate information recommendation even when the user data is highly sparse.

Figure 2:
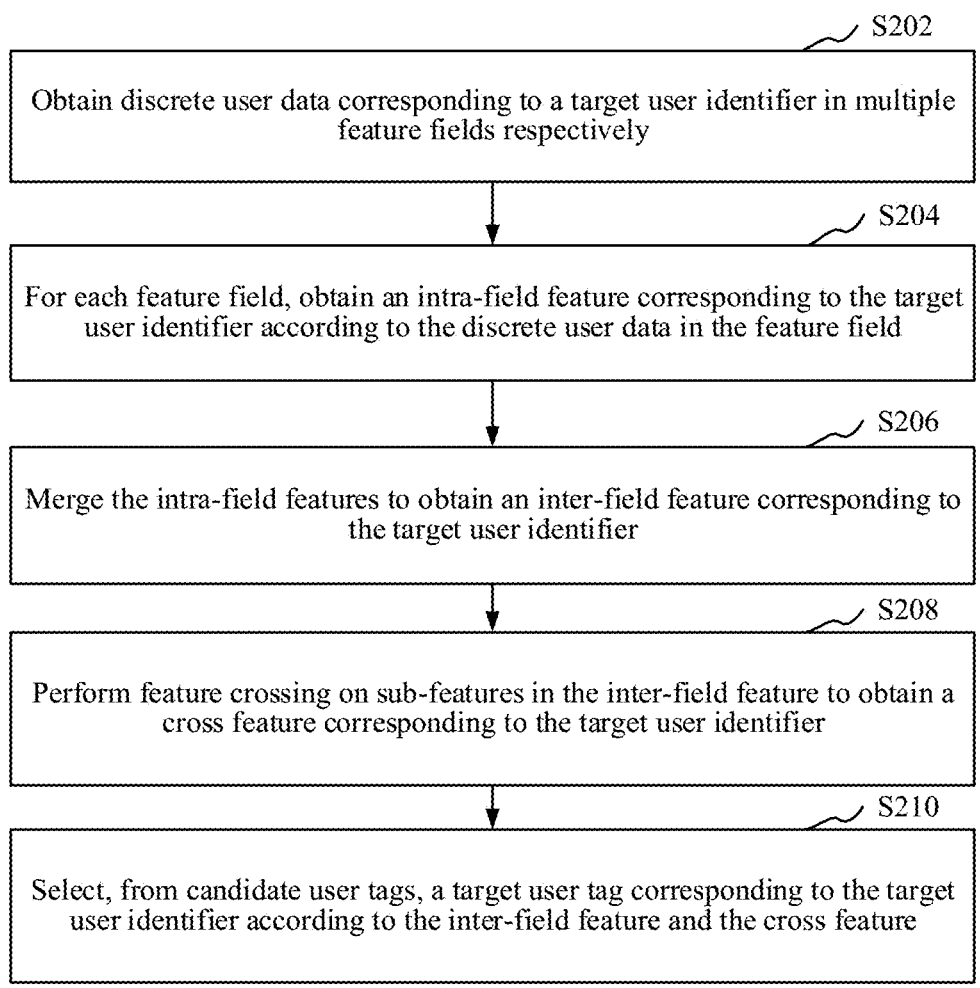
FIG. 2 is a schematic flowchart of a user tag generation method according to an embodiment.

As shown in FIG. 2, a user tag generation method is provided in an embodiment. In this embodiment, an example in which the method is applicable to a computer device is mainly used for description. The computer device may be the terminal 110 or the server 120 in FIG. 1. Referring to FIG. 2, the user tag generation method includes the following steps:

S202. Obtain discrete user data corresponding to a target user identifier in multiple feature fields respectively.

The discrete user data is discrete user data generated under a sparse behavior of a user. It can be understood that, generally, each user only acts on fragmented content of interest. Some fragmented user data is accordingly generated based on these fragmented behaviors, and data obtained by the computer device is discrete user data of each user.

The feature fields are fields to which user data of different attributes belongs, for example, an age field, a gender field, a video field, and an image-text field. In the embodiments of this application, in a feature field, one or more pieces of discrete user data may correspond to the target user identifier. For example, in a gender field, one piece of discrete user data corresponds to the target user identifier. That is, the discrete user data is male or female. However, in a video field, more than one piece of discrete user data may correspond to the target user identifier. For example, A watches a TV series XXX, and A watches a movie XX.

In an embodiment, the classification of feature fields may be customized according to an actual requirement. The multiple feature fields obtained in a feature-field classification manner may be one feature field obtained in another feature-field classification manner. For example, an age field, a gender field, and a geographical field are obtained in a classification manner A, and a basic information field is obtained in a classification manner B. The age field, the gender field, and the geographical field may be considered as sub-fields of the basic information field. One feature field obtained in a feature-field classification manner may be multiple feature fields obtained in another feature-field classification manner. For example, a video field obtained in a classification manner A may be classified into a video tag field and a video category field in a classification manner B. The video tag field and the video category field may be considered as sub-fields of the video field. A quantity of video tags in the video tag field is greater than a quantity of video categories in the video category field. That is, the classification of video tags is more detailed than the classification of video categories.

For example, the video categories in the video category field may be classified into sports, gourmet food, entertainment, automobiles, and the like. During actual application, video categories may be alternatively subclassified to obtain video tags. For example, sports may be subclassified into ball games, track and field events, racing games, and swimming competitions, and ball games may be further classified into basketball games, soccer games, table tennis games, and the like.

In some embodiments, the multiple feature fields may be eight fields, namely, an age field, a gender field, a geographic field, an image-text tag field, a video tag field, a public identifier field, an image-text category field, and a video category field.

In some embodiments, after determining the target user identifier, that is, user data that can uniquely identify a to-be-generated user tag, the computer device may crawl the discrete user data respectively corresponding to the target user identifier in the multiple feature fields on a network.

For example, assuming that there is a video application running on the terminal, after a server corresponding to the video application obtains a user identifier through which the video application is currently logged in on the terminal, the user identifier is used as the target user identifier, and the server then crawls the discrete user data respectively corresponding to the target user identifier in the multiple feature fields on the network. This application scenario may be understood as that an object that provides recommendation information has the capability of generating user tags.

In another embodiment, the computer device may alternatively obtain a user identifier transmitted by another computer device and obtain discrete user data respectively corresponding to the user identifier in multiple feature fields, to use the user identifier as the target user identifier and obtain the discrete user data respectively corresponding to the target user identifier in the multiple feature fields.

For example, assuming that there is a video application running on the terminal. After obtaining a user identifier through which the video application is currently logged in, the terminal may obtain discrete user data respectively corresponding to the user identifier in multiple feature fields, and then correspondingly transmit the user identifier and the obtained discrete user data to a computer device capable of generating user tags, and the computer device obtains the target user identifier and the discrete user data respectively corresponding to the target user identifier in the multiple feature fields. This application scenario may be understood as that a computer device capable of generating user tags provides a service of generating user tags for an object that provides recommendation information.

S204. For each feature field, obtain an intra-field feature corresponding to the target user identifier according to the discrete user data in the feature field.

The intra-field feature corresponding to a feature field is data that is obtained after discrete user data in the feature field is merged and reflects characteristics of a user in the feature field.

It can be understood that, generally, there is more than one piece of user data in a feature field, that is, the discrete user data. The data volume of more than one piece of user data is large and discrete. When the computer device generates user tags based on such data, complex calculations are required, and the obtained user tags may be less accurate. In this embodiment of this application, for each feature field, an intra-field feature is generated based on all discrete user data in the feature field. Characteristics of the target user in the feature field may be represented by using the intra-field feature, so that user characteristics can be abstracted and the discreteness of the data can be removed, to facilitate a subsequent process of user tag generation.

In an embodiment, the computer device separately vectorizes each piece of discrete user data in each feature field to obtain discrete feature vectors corresponding to the discrete user data, and then merges the discrete feature vectors corresponding to the discrete feature data in each feature field to obtain an intra-field feature vector corresponding to the feature field. The merge herein may be combining, concatenating, adding according to weights, or the like.

Vectorization is expressing other forms of data in a mathematical form. For example, "XXX" in a text form is represented in a mathematical form "[0 0 0 1 0 0 0 0 0 0 0 . . . ]". In this case, "[0 0 0 1 0 0 0 0 0 0 0 . . . ]" is a result of vectorizing "XXX", that is, a vector of "XXX". It can be understood that, a representation of a vector into which data in other forms is converted is not limited, provided that the other forms of data can be mathematically represented.

For example, assuming that discrete user data of a target user 1 in the video field includes "clicking to view a movie A", "clicking to view a TV series B", "clicking to view an animation C", and "clicking to view a short film D". The discrete user data is vectorized to obtain corresponding discrete feature vectors X1, X2, X3, and X4. X1, X2, X3, and X4 may be concatenated to obtain an intra-field feature vector X1+X2+X3+X4 corresponding to the target user 1 in the video field, or X1, X2, X3, and X4 may be averaged to obtain an intra-field feature vector (X1+X2+X3+X4)/4 corresponding to the target user 1 in the video field.

In an embodiment, the computer device may vectorize the discrete user data together in each feature field to obtain an intra-field feature corresponding to the feature field and corresponding to the target user identifier.

For example, assuming that the discrete user data of the target user 1 in the video field includes "clicking to view a movie A", "clicking to view a TV series B", "clicking to view an animation C", and "clicking to view a short film D". The computer device may vectorize the data together to obtain an intra-field feature vector Q corresponding to the target user 1 in the video field.

The discrete feature data is usually data in a text form. The intra-field feature may be data in a text form, data in a vector form, or data in another form. When the intra-field feature vector is data in a vector form, that is, a result obtained by merging the discrete feature vectors corresponding to the discrete feature data in each feature field.

S206. Merge the intra-field features to obtain an inter-field feature corresponding to the target user identifier.

The inter-field feature is data that is obtained after intra-field features corresponding to multiple feature fields are merged and can reflect both characteristics of the user in the feature fields and characteristics of the user between these feature fields. The merge is using a piece of data to represent more than one piece of data, and the piece of data includes information expressed by the more than one piece of data. The merge may be combining, concatenating, adding according to weights, or the like.

It can be understood that, generally, a user has user data of multiple feature fields. Even if each feature field corresponds to one intra-field feature, the intra-field features have a large data volume and are discrete. When the computer device generates user tags based on such data, complex calculations are required, and the obtained user tags may be less accurate. In this embodiment of this application, the intra-field features of multiple feature fields are merged to generate an inter-field feature, so that user characteristics can be abstracted and the discreteness of the data can be removed, to facilitate a subsequent process of user tag generation.

In an embodiment, the computer device separately vectorizes each piece of discrete user data in each feature field to obtain discrete feature vectors corresponding to the discrete user data, and then merges the discrete feature vectors corresponding to the discrete feature data in each feature field to obtain an intra-field feature vector corresponding to the feature field, and the computer device may then continue to merge the intra-field feature vectors to obtain an inter-field feature vector. The merge herein may be combining, concatenating, adding according to weights, or the like.

For example, assuming that intra-field feature vectors of the target user 1 corresponding to four feature fields are Y1, Y2, Y3, and Y4, Y1, Y2, Y3, and Y4 may be concatenated to obtain an inter-field feature vector Y1+Y2+Y3+Y4 corresponding to the target user 1, or Y1, Y2, Y3, and Y4 may be averaged to obtain an inter-field feature vector (Y1+Y2+Y3+Y4)/4 corresponding to the target user 1.

The inter-field feature vector may be data in a text form, data in a vector form, or data in another form. When the inter-field feature vector is data in a vector form, that is, the result obtained by merging the intra-field feature vectors corresponding to the feature fields.

S208. Perform feature crossing on sub-features in the inter-field feature to obtain a cross feature corresponding to the target user identifier.

The inter-field feature may include more than one sub-feature. The cross feature is data that is obtained after the sub-features in the intra-field feature are merged and reflects a correlation between the sub-features.

In some embodiments, the computer device may perform crossing on any two or more sub-features in the inter-field feature, so that more than one cross sub-feature that may represent a correlation between the sub-features may be obtained after the crossing, and the computer device then merges the cross sub-features to obtain a cross feature corresponding to the target user identifier. The merge herein may be combining, concatenating, adding according to weights, or the like.

When the inter-field feature is data in a vector form, that is, the inter-field feature vector, each vector element of the inter-field feature vector is a sub-feature of the inter-field feature vector.

For example, it is assumed that a sub-feature of the inter-field feature is represented by a vector element t (t is an integer greater than or equal to 0). The inter-field feature includes information about whether a user likes ball games, whether the user likes gourmet food, whether the user likes entertainment, whether the user likes automobiles, and the like. Information about whether the user likes ball games may further be subclassified into information about whether the user likes basketball games, whether the user likes soccer games, whether the user likes table tennis games, and the like. Assuming that whether the user likes basketball games is represented by a vector element $X_1$, and whether the user likes soccer games is represented by a vector $X_m$, a cross sub-feature $X_1 X_m$ may be obtained through crossing. Therefore, the user's interest in various ball games may be correlated through the cross sub-feature, to express user characteristics more accurately.

S210. Select, from candidate user tags, a target user tag corresponding to the target user identifier according to the inter-field feature and the cross feature.

In some embodiments, the computer device separately compares the inter-field feature and the cross feature with each candidate user tag, calculates a difference or similarity between the inter-field feature and the candidate user tag, and a difference or similarity between the cross feature and the candidate user tag, and then selects, according to the difference or similarity, a candidate user tag that matches the inter-field feature and the cross feature from the candidate user tags. A matching condition may be that the difference is less than or does not exceed a preset difference threshold, the similarity is greater than or reaches a preset similarity threshold, or the like.

In an embodiment, the computer device may alternatively first merge the inter-field feature and the cross feature to obtain a target feature, and then select a target user tag corresponding to the target user identifier from the candidate user tags according to the target feature. The target feature is finally obtained data that can express user characteristics more accurately. It can be understood that, the discrete feature data of the target user may be obtained from multiple feature fields. In this case, the target features are generated based on the discrete feature data from multiple feature fields, so that data sources of generating the target features may be expanded as much as possible. Moreover, the intra-field feature in each feature field is first obtained according to the discrete user data in the feature field, the intra-field features are then merged to obtain an inter-field feature, and feature crossing is then performed on the sub-features in the inter-field feature to obtain the cross feature, so that an inter-field feature that merges various sparse behaviors and a cross feature that merges the sub-features in the inter-field feature may be obtained. In this way, the target feature that merges the inter-field feature and the cross feature is obtained, thereby expressing user characteristics more accurately.

In some embodiments, after obtaining the inter-field feature and the cross feature, the computer device merges the two features to obtain the target feature. The computer device may then continue to compare the target feature with each candidate user tag, calculate a difference or similarity between the target feature and the candidate user tag, select a candidate user tag that matches the target feature according to the similarity or difference from the candidate user tags, and use the candidate user tag as the target user tag corresponding to the target user identifier.

For example, the computer device may vectorize the inter-field feature and the cross feature respectively to obtain the inter-field feature vector and the cross feature vector, and then merge the inter-field feature vector and the cross feature vector to obtain a target feature vector. The merge herein may be combining, concatenating, adding according to weights, or the like.

According to the foregoing user tag generation method, after discrete user data respectively corresponding to a target user identifier in multiple feature fields is obtained, in an aspect, the discrete user data is merged in the feature fields and between the feature fields, so that sparse behaviors can be adequately merged to obtain an inter-field feature that merges various sparse behaviors. In another aspect, crossing is performed on sub-features in the inter-field feature, so that the sub-features can be adequately merged to obtain a cross feature that merges the sub-features in the inter-field feature. The inter-field feature merges various sparse behaviors, and the cross feature merges the sub-features in the inter-field feature. Therefore, a target user tag corresponding to the target user identifier is selected from candidate user tags according to the inter-field feature and the cross feature, so that the accuracy of generating user tags can be effectively improved.

In an embodiment, S204 includes: inputting the discrete user data into a machine learning model, the machine learning model including an input layer and an intra-field merge layer; vectorizing the discrete user data by using the input layer, to obtain discrete feature vectors corresponding to the discrete user data; and merging the discrete feature vectors in the feature field by using the intra-field merge layer, to obtain an intra-field feature vector corresponding to the feature field and corresponding to the target user identifier.

The machine learning model is a mathematic model that has a function through sample learning. Machine learning is referred to as ML for short. The machine learning model may use a neural network model, a support vector machine, a logistic regression model, a random forest model, or a gradient boosting decision tree model. A learning manner of machine learning may be supervised learning, unsupervised learning, reinforcement learning, or the like.

The machine learning model in this embodiment of this application is a model that has, through sample learning, a capability of generating user tags. The machine learning model may be an end-to-end model. An input end is original discrete user data of the target user, and an output end is a score for a predicted candidate user tag to be the target user tag of the target user. The machine learning model has a multi-layer network structure, and different network layers process data inputted into the machine learning model in different manners, and output processing results to a next network layer.

In some embodiments, after obtaining the discrete user data respectively corresponding to the target user identifier in the multiple feature fields, the computer device may directly input the discrete user data in a text form into the machine learning model. An input layer of the machine learning model respectively maps the discrete user data into corresponding discrete feature vectors. For example, the input layer of the machine learning model maps discrete user data "female" into "[0 2 0 1 0 3 0 0 0 0 . . . ]", maps discrete user data "21 years old" into "[1 2 0 1 0 4 0 0 0 0 . . . ]", and maps discrete user data "Beijing Chaoyang District" into "[1 0 2 0 0 0 0 4 0 . . . ]".

In an embodiment, the input layer of the machine learning model respectively maps the discrete user data into corresponding discrete feature vectors in a fixed length. The fixed length may be considered as a dimension of a discrete feature vector. In this way, the discrete feature vectors are unified into the same dimension to facilitate subsequent merge. It can be understood that, because the amounts of discrete user data in different feature fields are different, the magnitude of the discrete user data in some feature fields is at a million level, while the magnitude of the amount of discrete user data in some feature fields is only at a ten level; a dimension of the discrete feature vector needs to be set as large as possible to retain enough information. For example, a dimension of a discrete feature vector is 128, 256, or the like.

Figure 3:
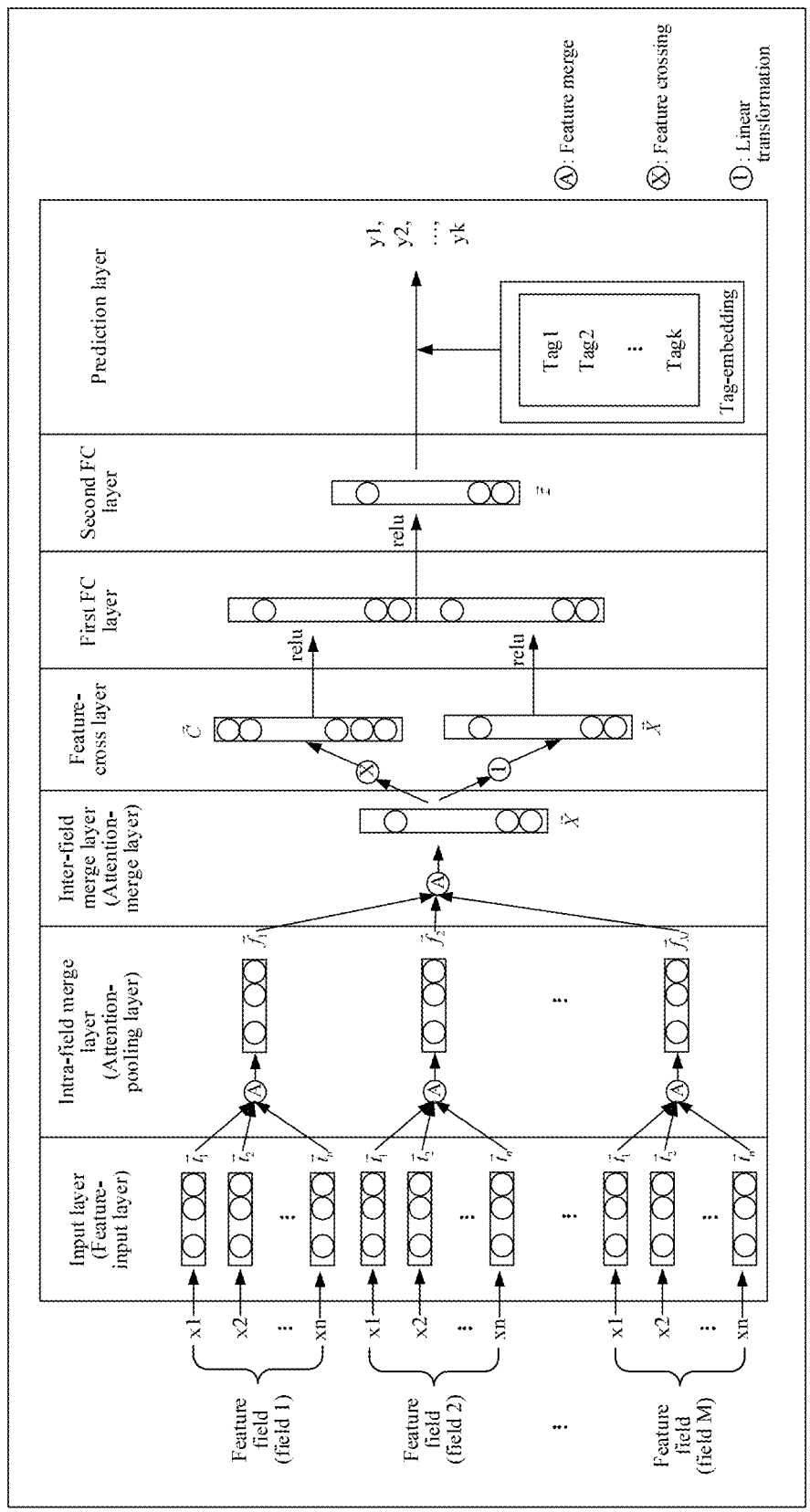
FIG. 3 is a schematic structural diagram of a machine learning model according to an embodiment.

For example, FIG. 3 is a schematic structural diagram of a machine learning model according to an embodiment. Referring to FIG. 3, the computer device may directly input the discrete user data respectively corresponding to the target user identifier in the multiple feature fields into the machine learning model, and an input layer (feature-input layer) of the machine learning model maps the discrete user data into corresponding discrete feature vectors. For example, the discrete user data x1, x2, . . . , xn of any one of the feature fields are respectively mapped into corresponding discrete feature vectors $\vec{t}_1, \vec{t}_2, \ldots,$ and $\vec{t}_n$.

In an embodiment, the merging the discrete feature vectors in the feature field by using the intra-field merge layer, to obtain an intra-field feature vector corresponding to the feature field and corresponding to the target user identifier includes: obtaining an attention distribution weight corresponding to each discrete feature vector in the feature field by using the intra-field merge layer; and performing linear merge on the discrete feature vectors in the feature field according to the corresponding attention distribution weights by using the intra-field merge layer, to obtain the intra-field feature vector corresponding to the feature field and corresponding to the target user identifier.

The intra-field merge layer is a network layer used for merging the discrete feature vectors corresponding to the discrete user data in a domain according to the feature fields in the machine learning model in this embodiment of this application. Through the intra-field merge layer, the inputted discrete feature vectors belonging to the same feature field may be merged into an intra-field feature vector, to obtain more than one intra-field feature vector. A quantity of the intra-field feature vectors is the same as a quantity of the feature fields. That is, each feature field corresponds to an intra-field feature vector. For example, the computer device obtains discrete user data in N feature fields, and N intra-field feature vectors may then be obtained through the intra-field merge layer.

It can be understood that, there may be a relatively large amount of discrete user data in a feature field, and the discrete user data has different levels of significance in reflecting user characteristics. For example, a user has tens of thousands of browsing records of sports videos in the video field, but has only several browsing records of entertainment videos. The user is clearly more interested in sports than in entertainment, and sports videos are more significant than entertainment videos in reflecting user characteristics. In view of this, when the discrete feature vectors corresponding to the discrete user data in a feature field are merged, a discrete feature vector that is significant in reflecting user characteristics needs to be reflected, to obtain an intra-field feature vector better representing user characteristics. In this embodiment, different attention distribution weights are assigned to different discrete feature vectors by using an attention mechanism, and the significance of a discrete feature vector is reflected through an attention distribution weight, so that a discrete feature vector that is significant in reflecting user characteristics is highlighted.

In an embodiment, a calculation formula of an attention distribution weight corresponding to a discrete feature vector is as follows:

$$\alpha_i = \frac{e^{\vec{u_t} \cdot relu(\vec{t_i} \cdot W_t + \vec{b_t})}}{\sum_{j}^{H} e^{\vec{u_t} \cdot relu(\vec{t_j} \cdot W_t + \vec{b_t})}}, \quad (1)$$

where $\vec{t}_i$ and $\vec{t}_j$ are both discrete feature vectors corresponding to the discrete feature vector, and $\alpha_i$ is an attention distribution weight of $\vec{t}_i$. A spatial transformation matrix $W_t$, an offset $\vec{b}_t$, and an intra-field attention vector $\vec{u}_t$ are model parameters in the intra-field merge layer. All the parameters are obtained through model training and learning. A nonlinear function relu is an activation function in the intra-field merge layer. $\vec{t}_i$ may be transformed into an attention space by using the spatial transformation matrix $W_t$, the offset $\vec{b}_t$, and the nonlinear function relu, $\vec{t}_i$ is then multiplied by the intra-field attention vector $\vec{u}_t$, to obtain attention distribution information of $\vec{t}_i$ the attention space and in the feature field, and an attention distribution weight of i $\vec{t}_i$ in the attention space and in the feature field may be then obtained by weight calculation through softmax. H is a quantity of the discrete feature data in the feature field.

In an embodiment, the computer device may screen the discrete user data in the feature field when the data volume of the discrete user data in the feature field is relatively large, and filter out less significant discrete user data. The less significant discrete user data may be discrete user data that appears less often. For example, a user has tens of thousands of browsing records of sports videos in the video field, but has only several browsing records of entertainment videos. In this case, the several browsing records of entertainment videos may be filtered out. In this case, the computer device may control the discrete user data in each feature field within a preset quantity.

An intra-field feature vector corresponding to a feature field k may be obtained by using the following formula:

$$\vec{f}_k = \Sigma_i^H \alpha_i * \vec{t}_i \quad (2).$$

Still referring to FIG. 3, the discrete feature vector outputted by the input layer is inputted into the intra-field merge layer (attention-pooling layer). The intra-field merge layer merges the discrete feature vectors in each feature field based on the attention mechanism, to obtain the intra-field feature vectors ($\vec{f}_1, \vec{f}_2, \ldots, \vec{f}_M$) corresponding to the feature fields and outputs the intra-field feature vectors to a next layer. M is a quantity of the feature fields. The principle of merging the discrete feature vectors in a feature field based on the attention mechanism by using the intra-field merge layer is shown in FIG. 4.

Figure 4:
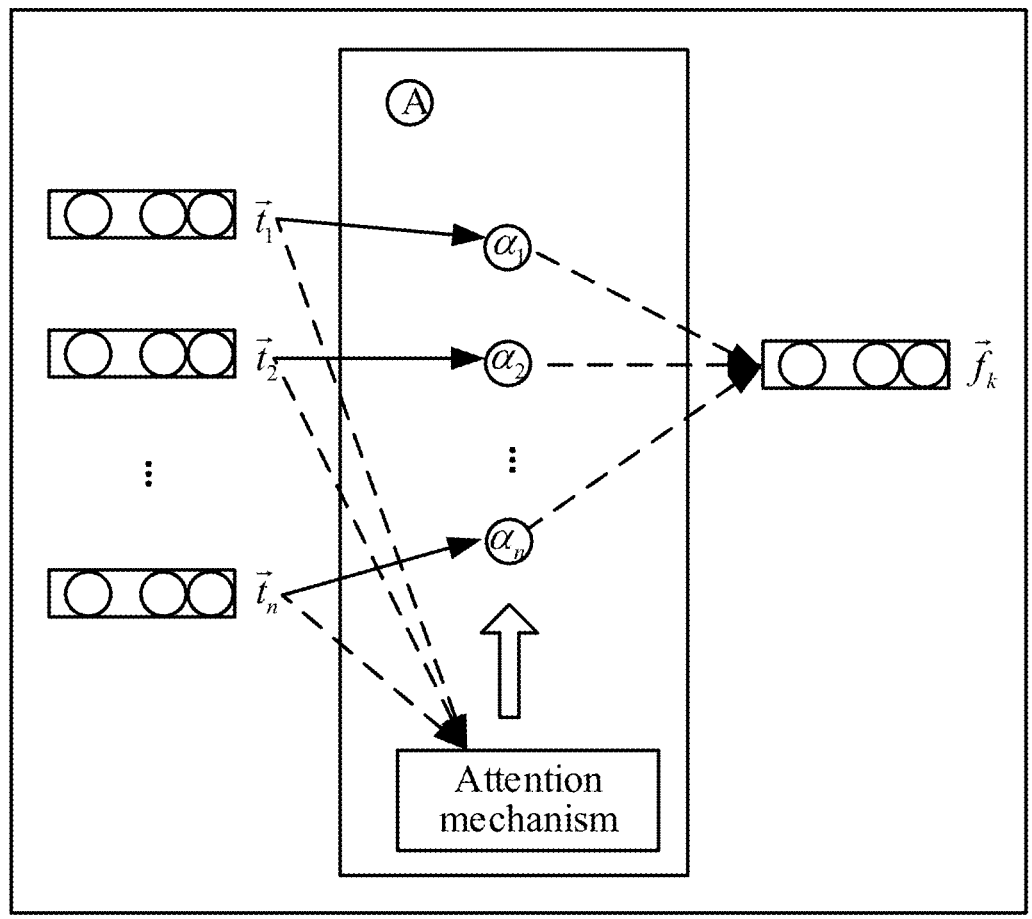
FIG. 4 is a schematic diagram of the principle of merging discrete feature vectors in a feature field based on an attention mechanism by using an intra-field merge layer in a machine learning model according to an embodiment.

Referring to FIG. 4, the intra-field merge layer in the machine learning model may calculate an attention distribution weight for each discrete feature vector based on the attention mechanism by using model parameters of the intra-field merge layer. For example, in a feature field k, an attention distribution weight of a discrete feature vector $\vec{t}_1$ is $\alpha_1$, an attention distribution weight of a discrete feature vector $\vec{t}_2$ is $\vec{\alpha}_2$, and an attention distribution weight of a discrete feature vector $\vec{t}_n$ is $\alpha_n$. The intra-field merge layer then performs weighted averaging on the discrete feature vectors in the feature field according to the corresponding attention distribution weights to obtain an intra-field feature vector $\vec{f}_k$ corresponding to the feature field.

In an embodiment, the computer device unifies the discrete feature vectors corresponding to the discrete user data into the same dimension, and dimensions of obtained intra-field feature vectors in the feature fields are also the same, which are the same as the dimensions of the discrete feature vectors.

In the foregoing embodiment, when merging the discrete feature vectors in the feature field, an attention mechanism merge method is adopted to assign different merge weights to different discrete feature vectors, so that more significant information may be selectively selected from a large number of discrete feature vectors as a supplement to more fully represent user characteristics, thereby greatly improving the accuracy and effectiveness of the obtained intra-field feature vectors.

In this way, the computer device performs data processing by using the machine learning model. The machine learning model in this embodiment of this application is a model obtained through supervised training by using samples. Therefore, after a model structure, training samples, and corresponding training tags are selected and set, model parameters may be self-learned through the samples, so that the capability of better expression of user characteristics in a vector form is learned by using powerful feature expression and learning capabilities of the machine learning model, which is conducive to subsequent processing and the generation of user tags.

In an embodiment, the machine learning model further includes an inter-field merge layer. S206. Obtain an attention distribution weight corresponding to each intra-field feature vector by using the inter-field merge layer; and perform linear merge on the intra-field feature vectors according to the corresponding attention distribution weights by using the inter-field merge layer, to obtain an inter-field feature vector corresponding to the target user identifier.

The inter-field merge layer is a network layer for performing inter-field merge on the intra-field feature vectors in the feature fields in the machine learning model in this embodiment of this application. Through the inter-field merge layer, the intra-field feature vectors of the feature fields inputted into the inter-field merge layer may be merged into an inter-field feature vector. For example, the intra-field merge layer outputs N intra-field feature vectors to the inter-field merge layer, and the inter-field merge layer then merges the N intra-field feature vectors into an inter-field feature vector.

It can be understood that, a user may correspond to discrete user data in a relatively large quantity of feature fields, and the discrete user data in different feature fields has different levels of significance in reflecting user characteristics. For example, a user has tens of thousands of browsing records in the image-text field, but has only several browsing records in the video field. The user is more interested in the image-text field than in the video field, and the image-text field is more significant than the video field in reflecting user characteristics. In view of this, when the intra-field feature vectors corresponding to the multiple feature fields are merged, a feature field that is significant in reflecting user characteristics needs to be reflected, to obtain an inter-field feature vector better in representing user characteristics. In this embodiment, different attention distribution weights are assigned to different intra-field feature vectors by using the attention mechanism, and the significance of a feature field is reflected through an attention distribution weight, so that a feature field that is significant in reflecting user characteristics is highlighted.

In an embodiment, a calculation formula of an attention distribution weight corresponding to an intra-field feature vector is as follows:

$$\beta_k = \frac{e^{\vec{u_f} \cdot relu(\vec{f_k} \cdot W_f + \vec{b_f})}}{\sum_j^M e^{\vec{u_f} \cdot relu(\vec{f_j} \cdot W_f + \vec{b_f})}}, \quad (3)$$

where both $\vec{f}_k$ and $\vec{f}_j$ are intra-field feature vectors, and $\beta_k$ is an attention distribution weight of $\vec{f}_k$. A spatial transformation matrix $W_f$, an offset $\vec{b}_f$, and an inter-field attention vector $\vec{u}_f$ are model parameters in the inter-field merge layer. All the parameters are obtained through model training and learning. A nonlinear function relu is an activation function in the inter-field merge layer. $\vec{f}_k$ may be transformed into an attention space by using the spatial transformation matrix $W_f$, the offset $\vec{b}_f$, and the nonlinear function relu, $\vec{f}_k$ is then multiplied by the inter-field attention vector $\vec{u}_f$, to obtain attention distribution information of $\vec{f}_k$ in the attention space and between the feature fields, and an attention distribution weight of $\vec{f}_k$ in the attention space and between the feature fields may then be obtained by weight calculation through softmax. M is a quantity of the intra-field feature vectors, that is, a quantity of the feature fields.

The inter-field feature vector may be obtained by using the following formula:

$$\vec{X} = \Sigma_k^M \beta_i * \vec{f}k \quad (4)$$

Still referring to FIG. 3, the intra-field feature vector outputted by the input layer is inputted into the inter-field merge layer (attention-merge layer). The inter-field merge layer merges the intra-field feature vectors in each feature field based on the attention mechanism, to obtain the inter-field feature vectors $\vec{X}$ and outputs the inter-field feature vector to a next layer.

In an embodiment, the computer device unifies the discrete feature vectors corresponding to the discrete user data into the same dimension, and dimensions of obtained intra-field feature vectors in the feature fields are also the same, which are the same as the dimensions of the discrete feature vectors. A dimension of the obtained inter-field feature vector by merging the intra-field feature vectors is the same as that of the discrete feature vector.

In the foregoing embodiment, when merging the intra-field feature vectors corresponding to the feature fields, an attention mechanism merge method is adopted to assign different merge weights to different intra-field feature vectors, so that more significant information may be selectively selected from a large number of the intra-field feature vectors as a supplement to more fully represent user characteristics, thereby greatly improving the accuracy and effectiveness of the obtained inter-field feature vectors.

In an embodiment, the machine learning model further includes a feature-cross layer. S208. Desparsify an inter-field feature vector by using the feature-cross layer, to obtain a densified inter-field feature vector; and perform second-order crossing on sub-features in the densified inter-field feature vector, to obtain the cross feature.

It can be understood that, through the foregoing embodiments, the computer device has mapped, by using the machine learning model, the large amount of the obtained discrete user data of the target user as an inter-field feature vector. After the intra-field merge and inter-field merge based on the attention mechanism, the inter-field feature vector can better express user characteristics to some extent. However, there is a lack of expression for a correlation between user data between feature fields, a cross feature that can express a correlation between the user data may be obtained by performing crossing on the inter-field feature.

In some embodiments, when the computer device maps the discrete user data into the discrete feature vectors by using the machine learning model, in order to retain more information, dimensions of the discrete feature vectors are usually set to be relatively large, and a dimension of the obtained inter-field feature vector based on the discrete feature vectors after the intra-field merge and inter-field merge is larger as well, from which it can be seen that feature expression of the inter-field feature vector is relatively sparse. To better perform the crossing on the sub-features in the inter-field feature vector by using the machine learning model, the computer device skillfully integrates a processing principle of a factorization machine and desparsifies the inter-field feature vector based on the processing principle of a factorization machine to obtain a densified inter-field feature vector, to perform feature crossing based on the densified inter-field feature vector.

In an embodiment, the desparsifying an inter-field feature vector by using the feature-cross layer, to obtain a densified inter-field feature vector includes: respectively mapping the sub-features in the inter-field feature vector into hidden layer space vectors in a preset dimension by using the feature-cross layer. The performing second-order crossing on sub-features in the densified inter-field feature vector, to obtain the cross feature includes: using, for any two sub-features in the inter-field feature vector, a product of the two sub-features and the hidden layer space vectors obtained by mapping the two sub-features as a second-order cross feature vector of the two sub-features; and combining the second-order cross feature vectors to obtain a cross feature vector.

It can be understood that, the sub-features in the inter-field feature vector are sparse in an inter-field feature space, which is not conductive to a calculation. However, the sub-features may be mapped into another space, and in this space, results obtained by mapping the sub-features may be densified. The space may be referred to as a hidden layer vector space, and the results obtained by mapping the sub-features may be hidden layer space vectors.

In some embodiments, when the computer device calculates a correlation between two sub-features by using the feature-cross layer, a hidden layer space vector may be used as a representation of a sub-feature, and a cross sub-feature between the sub-features may then be obtained by calculating the hidden layer space vectors. It can be understood that, in the embodiments, the sparse sub-features in the inter-field feature vector are mapped into the hidden layer vector space, and desparsification is then performed by using densified hidden layer space vectors.

For example, assuming that an inter-field feature vector outputted by the inter-field merge layer in the machine learning model in this application is $\vec{X} = \{X_1, X_2, \ldots, X_i, \ldots, X_j, \ldots\}$ for a correlation between any two sub-features $X_i$ and $X_j$ in $\vec{X}$, the feature-cross layer may map the sub-feature $X_i$ into a hidden layer space vector $\vec{V}_i$ for expression, map the sub-feature $X_j$ into a hidden layer space vector $\vec{V}_j$ for expression, and then obtain a second-order cross feature vector $\overrightarrow{C_{i,j}}$ between the sub-features $X_i$ and $X_j$ through a calculation of $(V_i \cdot V_j)*X_i*X_j$.

Based on the above, the feature-cross layer may combine the second-order cross feature vectors to obtain a cross feature vector, as shown in the following formula:

$$\vec{C} = \{C_{1,2}, C_{1,3}, \ldots, C_{i,j}, \ldots\} = \tag{5}$$
$$\left\{ \left(\overrightarrow{V_1} \cdot \overrightarrow{V_2}\right) * X_1 * X_2, \left(\overrightarrow{V_1} \cdot \overrightarrow{V_3}\right) * X_1 * X_3, \ldots, \left(\overrightarrow{V_i} \cdot \overrightarrow{V_j}\right) * X_i * X_j, \ldots \right\},$$

where assuming that a dimension of the inter-field feature vector $\vec{X}$ is N, a dimension of the cross feature vector is $N*(N-1)/2$.

In this embodiment, an inter-field feature vector obtained based on a scenario corresponding to this embodiment of this application is provided, and in a manner of combining the principle of a factorization machine to calculate the cross feature, a more accurate cross feature vector can be obtained.

Still referring to FIG. 3, the inter-field feature vector outputted by the inter-field merge layer is inputted into a feature-cross layer. The feature-cross layer performs feature crossing on the sub-features in the inter-field feature vector based on the principle of a factorization machine to obtain a cross feature vector $\vec{C}$ and outputs the cross feature vector $\vec{C}$ to a next layer. The principle of performing feature crossing on the sub-features in the inter-field feature vector based on the principle of a factorization machine by using the feature-cross layer is shown in FIG. 5.

Figure 5:
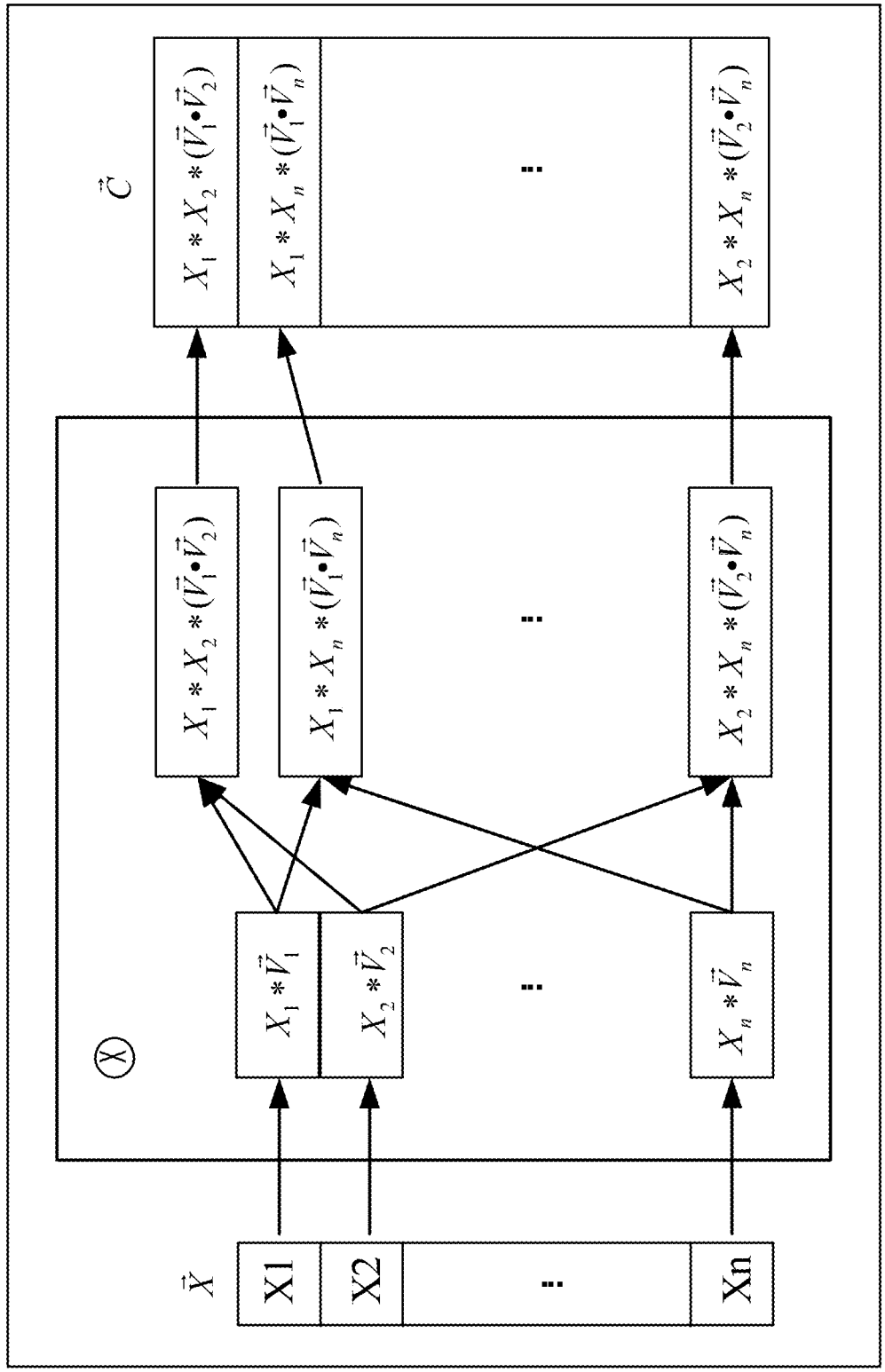
FIG. 5 is a schematic diagram of the principle of performing feature crossing on sub-features in an inter-field feature vector based on the principle of a factorization machine by using a feature-cross layer in a machine learning model according to an embodiment.

Referring to FIG. 5, the feature-cross layer may map sub-features in an inter-field feature vector (X1, X2, ..., Xn) into hidden layer space vectors $\vec{V}_1, \vec{V}_2, \ldots,$ and $\vec{V}_n$. For the sub-features in the inter-field feature vector, products of the sub-features and the hidden layer space vectors can be obtained as follows: $X_1*\vec{V}_1, X_2*\vec{V}_2, \ldots,$ and $X_n*\vec{V}_n$. The feature-cross layer performs a point multiplication operation on any two products to obtain a plurality of cross sub-features $X_1*X_2*(\vec{V}_1 \cdot \vec{V}_2), X_1*X_n*(\vec{V}_1 \cdot \vec{V}_n), \ldots,$ and $X_2*X_n*(\vec{V}_2 \cdot \vec{V}_n)$. In this way, the feature-cross layer may concatenate the cross sub-features to obtain a cross feature vector $\vec{C}$.

In another embodiment, the computer device may alternatively perform feature crossing on more than two sub-features by using the feature-cross layer in the machine learning model, to obtain a higher-order cross sub-feature, for example, perform feature crossing on any three sub-features or four sub-features.

It can be understood that, the intra-field merge layer and the inter-field merge layer perform a first-order merge operation, and the feature-cross layer performs a second-order merge operation.

In the foregoing embodiment, crossing is performed on the sub-features in the inter-field feature vector based on the principle of a factorization machine, to avoid the problem that it is difficult to design a cross feature manually, so that even in a scenario with complex feature distribution, it is easy to fit features to obtain a second-order or even higher-order cross feature, to express a correlation between user characteristics in different feature fields through the second-order and higher-order cross feature, and improve the accuracy of final feature vectors for representing user characteristics.

In an embodiment, the machine learning model further includes a first fully connected (FC) layer and a second FC layer. S210. Concatenate a cross feature vector and an inter-field feature vector by using the first FC layer after a dimension of the cross feature vector is adjusted to be consistent with a dimension of the inter-field feature vector, to obtain an intermediate feature vector; map the intermediate feature vector into a target feature vector by using the second FC layer; and select the target user tag corresponding to the target user identifier from the candidate user tags according to the target feature vector.

Generally, each node of the FC layer is connected to all nodes of a previous layer to integrate features extracted by a pre-order layer. In this embodiment of this application, after performing feature crossing on the inter-field feature vector to obtain the cross feature vector, the feature-cross layer outputs the cross feature vector to the first FC layer. The feature-cross layer may further output the inter-field feature vector to the first FC layer after performing a linear transformation on the inter-field feature vector. The inter-field feature vector reflects characteristics of the user in and between fields, the cross feature vector reflects a correlation between the sub-features of the inter-field feature vector of the user, and all these features are features that are extracted by the pre-order layer and can reflect user characteristics. Therefore, the first FC layer may synthesize these features to collaboratively represent user characteristics.

According to the foregoing embodiment, it can be learned that the dimension of the cross feature vector obtained by performing feature crossing on the inter-field feature vector is different from the dimension of the inter-field feature vector. The first FC layer may first adjust the dimension of the cross feature vector to be consistent with the dimension of the inter-field feature vector, then concatenate the cross feature vector and the inter-field feature vector to obtain an intermediate feature vector, and output the obtained intermediate feature vector to the second FC layer. The second FC layer further merges the intermediate feature vectors concatenated by the features extracted by the pre-order layer, and finally the target feature vector that can more fully express user characteristics is obtained.

Still referring to FIG. 3, the cross feature vector outputted by the feature-cross layer is inputted into the first FC layer, and the inter-field feature vector outputted by the inter-field merge layer is also inputted into the first FC layer. After adjusting the dimension of the cross feature vector to be consistent with the dimension of the inter-field feature vector, the first FC layer concatenates the cross feature vector and the inter-field feature vector to obtain the intermediate feature vector, and then outputs the intermediate feature vector to the second FC layer. The second FC layer maps the intermediate feature vector into a target feature vector $\vec{z}$.

In an embodiment, the FC layer may process, by using the nonlinear activation function relu, inputted data to obtain a processing result.

In an embodiment, the machine learning model further includes a prediction layer. The selecting the target user tag corresponding to the target user identifier from the candidate user tags according to the target feature vector includes: outputting a correlation score between the target feature vector and a tag vector corresponding to each candidate user tag by using the prediction layer; and selecting a preset quantity of candidate user tags with top ranking correlation scores as target user tags corresponding to the target user identifier.

The prediction layer is a network layer for scoring a correlation between the target feature vector and a tag vector corresponding to each candidate user tag in the machine learning model in the embodiments of this application. A calculation may be performed on the inputted target feature vector and a tag vector corresponding to a candidate user tag by using the prediction layer, to obtain a correlation score. A user tag vector is obtained by vectorizing a candidate user tag in a text form.

In some embodiments, a large quantity of candidate user tags may be included in a user tag pool, and each candidate user tag may correspond to a user tag vector. After obtaining the target feature vector of the target user by using the machine learning model, the computer device may input the target feature vector and the user tag vector of the candidate user tag into the prediction layer, and output the correlation score between the target feature vector and the tag vector corresponding to each candidate user tag by using the prediction layer. The computer device may rank corresponding candidate user tags according to correlation scores. A candidate user tag corresponding to a tag vector having a high correlation score between the tag vector and the target feature vector ranks in the top, and a candidate user tag corresponding to a tag vector having a low correlation score between the tag vector and the target feature vector ranks in the bottom. In this way, the computer device may select, starting from the first candidate user tag in the sequence, a preset quantity of candidate user tags as target user tags corresponding to the target user identifier.

Still referring to FIG. 3, after mapping the intermediate feature vector into the target feature vector, the second FC layer transfers the intermediate feature vector to the prediction layer. The prediction layer then receives tag vectors (tag-embedding: Tag1, Tag2, . . . , Tagk) of the candidate user tags as an input to obtain correlation scores (y1, y2, . . . , yk) between the target feature vector and the tag vectors.

In an embodiment, the computer device may obtain correlation scores between the target feature vector and tag vectors corresponding to all candidate user tags in the user tag pool by using the prediction layer, or initially select some candidate user tags from the user tag pool and only calculate correlation scores between the target feature vector and tag vectors corresponding to these candidate user tags.

In terms of functions implemented by a machine learning network layer, the prediction layer may be considered as a multi-user-tag classifier. The correlation score between the target feature vector and the tag vector corresponding to each candidate user tag may be considered as a probability that the target feature vector is classified into each candidate user tag.

In this embodiment, when user tag classification is scored by using the prediction layer, powerful learning capability of the machine learning model can be used to improve the accuracy of the scoring.

In the foregoing embodiment, after the features extracted by the pre-order layer of the machine learning model, namely, the inter-field feature vector and the cross feature vector, are obtained, a target feature vector that can fully reflect user characteristics is obtained by combining the features, and user tags of the target user can then be more accurately selected based on the target feature vector.

In an embodiment, the user tag generation method further includes: collecting discrete user data samples respectively corresponding to a sample user identifier in the multiple feature fields; determining training tags of candidate user tags respectively corresponding to the discrete user data samples; inputting the discrete user data samples into the machine learning model, and outputting the discrete user data samples and a correlation score sample of a tag vector corresponding to each candidate user tag after the discrete user data samples are sequentially processed by the layers included in the machine learning model; and training the machine learning model according to a difference between the correlation score sample and a corresponding training tag.

It can be understood that, the training, by the computer device, the machine learning model is to classify user tags of a user based on user features, that is, to predict whether a user tag is to be labeled for the user. The computer device may set candidate user tags in advance, then collect discrete user data samples respectively corresponding to a sample user identifier in the multiple feature fields, and determine training tags of candidate user tags respectively corresponding to the discrete user data samples, to perform supervised training on the machine learning model.

In some embodiments, the machine learning model is classified according to a correlation between a user characteristic and a user tag. In this way, a part of the machine learning model may be set to extract and represent features of discrete user data, to obtain a high-order target feature vector that can fully reflect user characteristics. The remaining part of the machine learning model may then be set to score a correlation between the target feature vector and a vector (tag vector) corresponding to each type (candidate user tag). When training data of the machine learning model is designed, all discrete user data samples corresponding to each sample user identifier may be used as a training input of the machine learning model, and training tags of each type (candidate user tag) respectively corresponding to all discrete user data samples that correspond to each sample user identifier are determined. In this way, after an intermediate layer of the machine learning model obtains target feature vector samples corresponding to each sample user identifier, the target feature vector samples may be classified according to user tags. In this case, the target feature vector samples have training tags respectively corresponding to each type (candidate user tag), and supervised training may be performed on the machine learning model.

Further, the computer device may construct a loss function according to differences between inputted correlation score samples corresponding to each candidate user tag and corresponding training tags, and then adjust the model parameters of the machine learning model in a direction for minimizing the loss function and continue to train the machine learning model, until a training end condition is satisfied.

For a processing procedure of inputting, by the computer device, the discrete user data samples into the machine learning model, and outputting the discrete user data samples and a correlation score sample of a tag vector corresponding to each candidate user tag after the discrete user data samples are sequentially processed by the layers included in the machine learning model, reference may be made to a data processing procedure when the machine learning model is used on the foregoing embodiments.

In an embodiment, the computer device may define the loss function by using sigmoid cross entropy. In this case, the loss function of the prediction layer of the machine learning model is as follows:

$$\text{Loss} = -\frac{1}{K} * \sum_{k-1}^{K} (\hat{y_k} \log y_k + (1 - \hat{y_k}) \log(1 - y_k)), \quad (6)$$

$$y_k = \frac{1}{1 + e^{-\vec{e} \cdot \vec{t_k}}}, \quad (7)$$

where K is a quantity of candidate user tags, $\hat{}$ is a training tag of a $k^{th}$ candidate user tag corresponding to all the discrete user data samples that correspond to the sample user identifier, yk is a correlation score, actually outputted by using the prediction layer of the machine learning model, between the $k^{th}$ candidate user tag and all the discrete user data samples corresponding to the sample user identifier. $\vec{e}$ is the target feature vector sample obtained by processing all the discrete user data samples corresponding to the sample user identifier by using the machine learning model, and $\vec{t}_k$ is a tag vector of the $k^{th}$ candidate user tag.

The computer device has set a large quantity of candidate user tags in advance. For a specific user, usually only some of these candidate user tags are consistent with characteristics of the specific user and can be labeled for the specific user, and the other part is not consistent with characteristics of the specific user and is not to be labeled for the specific user. The training tags of the candidate user tags respectively corresponding to the discrete user data samples determined by the computer device may include positive training tags and negative training tags.

In an embodiment, the computer device may obtain browsing history corresponding to the sample user identifier, query candidate user tags corresponding to clicked content in the browsing history, and determine that training tags of the candidate user tags corresponding to discrete user data samples are positive training tags. Some candidate user tags are then randomly selected from the user tag pool, and training tags of these candidate user tags corresponding to the discrete user data samples are determined as negative training tags. In this way, positive and negative examples may be combined to train the machine learning model.

It can be understood that, when a user generates a user behavior on a computer device, a browsing record is usually formed. For example, browsing history is formed after a user watches a video in a video application, and browsing history is also formed after the user views a piece of news in a news application. There may be a candidate user tag corresponding to an object on which the user behavior is implemented. For example, the object on which the user behavior is implemented is a movie XX, which is an action thriller, and there may be corresponding candidate user tags "thriller" and "action" for the movie. The training data for training the machine learning model may be obtained based on such content, and after the user tags are generated for the user by using the trained machine learning model, objects on which the user behavior is implemented may be recommended to the user based on the generated user tags, such as videos, news, image-text articles, promotion content, and the like.

For example, assuming that one piece of clicked content (a video, a piece of news, or the like) "XX . . . " exists in browsing history corresponding to the sample user identifier, a candidate user tag corresponding to the clicked content is "entertainment", and a training tag of the candidate user tag "entertainment" corresponding to a discrete user data sample that corresponds to the sample user identifier is a positive training tag. The computer device randomly selects a candidate user tag "sports" from the user tag pool, and a training tag of the candidate user tag "sports" corresponding to a discrete user data sample that corresponds to the sample user identifier is set as a negative training tag.

In an embodiment, the determining training tags of candidate user tags respectively corresponding to the discrete user data samples includes: obtaining browsing history corresponding to the sample user identifier; querying a first candidate user tag corresponding to clicked content in the browsing history and a second candidate user tag corresponding to unclicked content in the browsing history; and setting training tags of first candidate user tags respectively corresponding to the discrete user data samples as positive training tags, and setting training tags of second candidate user tags respectively corresponding to the discrete user data samples as negative training tags.

It can be understood that when a user acts on a computer device, a browsing record is usually formed. For example, browsing history is formed after a user watches a video in a video application, and browsing history is also formed after the user views a piece of news in a news application. The browsing history may include records of exposed but unclicked content and records of exposed and clicked content. The records of exposed but unclicked content are records of content that has been displayed to the user but has not been further clicked and viewed by the user. The records of exposed and clicked content are records of content that has been displayed to the user and has been further clicked and viewed by the user.

Generally, the user further clicks and views exposed content only when the user is interested in the content, and the user may not click and view exposed content when the user is not interested in the content. Based on the above, the exposed and clicked content may be considered as content that the user is interested in, and a candidate user tag corresponding to the exposed and clicked content may reflect a characteristic of the user and is labeled for the user. The exposed but unclicked content may be considered as content that the user is not interested in, and a candidate user tag corresponding to the exposed but unclicked content cannot reflect a characteristic of the user and therefore is not to be labeled for the user.

In some embodiments, after obtaining browsing history corresponding to the sample user identifier, the computer device may query exposed and clicked content and exposed but unclicked content in the browsing history, and determine a first candidate user tag corresponding to the exposed and clicked content and a second candidate user tag corresponding to the exposed but unclicked content. The first candidate user tag is a user tag that may be labeled for the user, and training tags of the first candidate user tags respectively corresponding to discrete user data samples of the user are set as positive training tags. The second candidate user tag is a user tag that is not to be labeled for the user, and training tags of the second candidate user tags respectively corresponding to the discrete user data samples of the user are set as negative training tags.

In this embodiment, the user tags of the exposed and clicked content in the browsing history of the selected sample user are positive examples, and the user tags of the exposed but unclicked content are negative examples, so that more appropriate positive and negative examples may be obtained to train the model.

In an embodiment, the user tag generation method further includes: selecting a reference user identifier different from the sample user identifier and a discrete user data sample corresponding to the reference user identifier; obtaining a third candidate user tag corresponding to the positive training tag of the discrete user data sample; and setting a training tag of each third candidate user tag as a negative training tag of a discrete user data sample corresponding to the sample user identifier.

A user identified by the reference user identifier may be another sample user. In some embodiments, the computer device may select the reference user identifier different from the sample user identifier, obtain the candidate user tags corresponding to the positive training tags of the discrete user data samples that correspond to the reference user identifier, and then set the training tags of the candidate user tags respectively corresponding to the discrete user data samples of the sample user identifier as negative training tags. That is, there are more than one sample user. A positive example of one sample user may be used as a negative example of another sample user.

For example, user a: positive examples: 0, 2, and 3; and negative examples: 4, and 5; and user b: positive examples: 6, 11, and 7; and negative examples: 12, and 9 (numbers represent corresponding user tag indexes). The positive examples of the user a may be used as a supplement to the negative examples of the user b. That is, the positive examples of the user b are changed into 0, 2, 3, 12, and 9. The significance of such processing lies in that sufficient accuracy may still remain for sparse user tags that appear less often, and therefore, personalized interest of each user is reflected.

In an embodiment, when the machine learning model is trained, three groups of different positive and negative samples are organized in different sample organization manners. Offline tests are performed on the model by using the three groups of positive and negative samples. Test results are shown in Table 1 below.

TABLE 1

| Sample organization manner | Prec@10 | Prec@20 | Prec@50 |
| --- | --- | --- | --- |
| Model V1 | 0.3566 | 0.3401 | 0.3239 |
| Model V2 | 0.3779 | 0.3566 | 0.3372 |
| Model V3 | 0.3824 | 0.3617 | 0.3422 |

User tags of exposed and clicked content are used as positive examples of the model V1, and random user tags are used as negative examples; user tags of exposed and clicked content are used as positive examples of the model V2, and user tags of exposed but unclicked content are used as negative examples; and user tags of exposed and clicked content are used as positive examples of the model V3, and user tags of exposed but unclicked content and positive examples of a previous sample user are used as negative examples. Prec@K represents a proportion of user tags as positive examples in K tags having the highest correlation scores estimated by using the machine learning model. From Table 1, it can be seen that after two steps of optimization, the positive and negative examples are significantly improved at each position of Prec@K. That is, user tags ranking in the top predicted by the machine learning model are quite precise.

When performing feature processing, the machine learning model tested in Table 1 does not perform intra-field merge based on the attention mechanism or does not perform intra-field merge based on the attention mechanism and does not perform feature crossing based on the principle of a factorization machine.

In an embodiment, when the machine learning model is trained, intra-field merge performed based on the attention mechanism, inter-field merge performed based on the attention mechanism and feature crossing performed based on the principle of a factorization machine are added gradually. The user tags of exposed and clicked content are then used as positive examples, and the user tags of exposed but unclicked content and the positive examples of the previous sample user are used as negative examples to perform offline tests. Test results are shown in Table 2 below.

TABLE 2

| Model improvement manner | Loss | Prec@10 | Prec@20 | Prec@50 |
| --- | --- | --- | --- | --- |
| Model V3 | 0.326 | 0.3824 | 0.3617 | 0.3422 |
| Model V4 | 0.323 | 0.3829 | 0.3623 | 0.3427 |
| Model V5 | 0.319 | 0.3836 | 0.3622 | 0.3425 |
| Model V6 | 0.314 | 0.3838 | 0.3634 | 0.3434 |

The machine learning model tested by using the model V3 does not perform intra-field merge based on the attention mechanism, does not perform inter-field merge based on the attention mechanism, and does not perform feature crossing based on the principle of a factorization machine; intra-field merge performed based on the attention mechanism is added to the machine learning model tested by using the model V4; intra-field merge performed based on the attention mechanism and feature crossing performed based on the principle of a factorization machine are added to the machine learning model tested by using the model V5; and intra-field merge performed based on the attention mechanism, inter-field merge performed based on the attention mechanism, and feature crossing performed based on the principle of a factorization machine are added to the machine learning model tested by using the model V6. From Table 2, it can be seen that the loss function of the model gradually reduces with gradual improvement of the model, and Prec@K gradually increases (except that Prec@20 and Prec@50 of model V4 are slight low, which may be caused by overfitting of the model).

In another embodiment, the computer device further performs an online verification on the trained machine learning model. The computer device may define measurement indicators: a quantity click (QC), a click through rate (CTR), and a document-based click through rate (DCTR). User tags corresponding to exposed and clicked recommended content are used as data for the foregoing indicators. The QC is a quantity of clicks per user of a user tag. More QCs indicate that a provided user tag covers wider interest of a user. The CTR represents dividing a quantity of clicks of a user tag by a quantity of times that the user tag is exposed. A higher CTR indicates higher efficiency of exposure. The DCTR represents dividing a quantity of deduplicated clicked user tags of each person by a quantity of deduplicated exposed user tags. A higher DCTR indicates higher accuracy of the user tags. The quantity of times that a user tag is exposed is a quantity of times that recommended content corresponding to the user tag is exposed, and the quantity of times that a user tag is clicked is a quantity of times that the recommended content corresponding to the user tag is clicked.

In an embodiment, for the model tested by the model V3 and the model V6, an online test for the QC, the CTR, and the DCTR is performed. A result of the test is shown in Table 3.

TABLE 3

| Model improvement manner | QC | CTR | DCTR |
|---|---|---|---|
| Model V3 | 0.78% | 3.89% | 7.42% |
| Model V6 | 2.36% | 4.24% | 7.94% |

From Table 3, it can be seen that after the intra-field merge performed based on the attention mechanism, the inter-field merge performed based on the attention mechanism, and feature crossing performed based on the principle of a factorization machine are added to the machine learning model, the QC, the CTR, and the DCTR are greatly improved.

In the foregoing embodiment, the computer device performs supervised training on the machine learning model by using samples to perform data processing. After a model structure, training samples, and corresponding training tags are selected and set, model parameters may be self-learned through the samples, so that the capability of better expression of user characteristics in a vector form is learned by using powerful feature expression and learning capabilities of the machine learning model, thereby improving the accuracy of generating user tags.

In an embodiment, the user tag generation method further includes: obtaining multiple pieces of to-be-recommended content; determining a user tag corresponding to each piece of to-be-recommended content; and recommending one of the multiple pieces of to-be-recommended content corresponding to the user tag that matches the target user tag to a terminal corresponding to the target user identifier.

The to-be-recommended content is content to be recommended to the user. The to-be-recommended content may be promotion information, applications, videos, audio, news, articles, commodities, or the like. Each piece of to-be-recommended content may have a corresponding user tag. A user tag corresponding to the to-be-recommended content may be selected from the user tag pool according to content features of the to-be-recommended content. A user tag corresponding to the to-be-recommended content may reflect content characteristics of the to-be-recommended content. User tags of a user may reflect characteristics of interest of the user. Content may then be recommended to the user based on the user tags. When a user tag corresponding to one piece of to-be-recommended content matches a user tag of a user, it may be considered that the to-be-recommended content conforms to the interest of the user, and the to-be-recommended content may be recommended to the user.

In some embodiments, the computer device may obtain multiple pieces of to-be-recommended content, respectively determine a user tag corresponding each piece of to-be-recommended content, and compare the user tag corresponding to the piece of to-be-recommended content with the target user tag, that is, compare the user tag with the user tag of the target user. When the user tag corresponding to each piece of to-be-recommended content matches the target user tag, the to-be-recommended content is recommended to the terminal corresponding to the target user identifier.

In an embodiment, there may be more than one target user tag, and there is an order of the more than one target user tag. There is also a recommendation order when to-be-recommended content corresponding to user tags that match the target user tags is recommended. To-be-recommended content corresponding to a user tag that matches a target user tag ranking in the top is recommended first, and to-be-recommended content corresponding to a user tag that matches a target user tag ranking in the bottom is recommended next.

Figure 6:
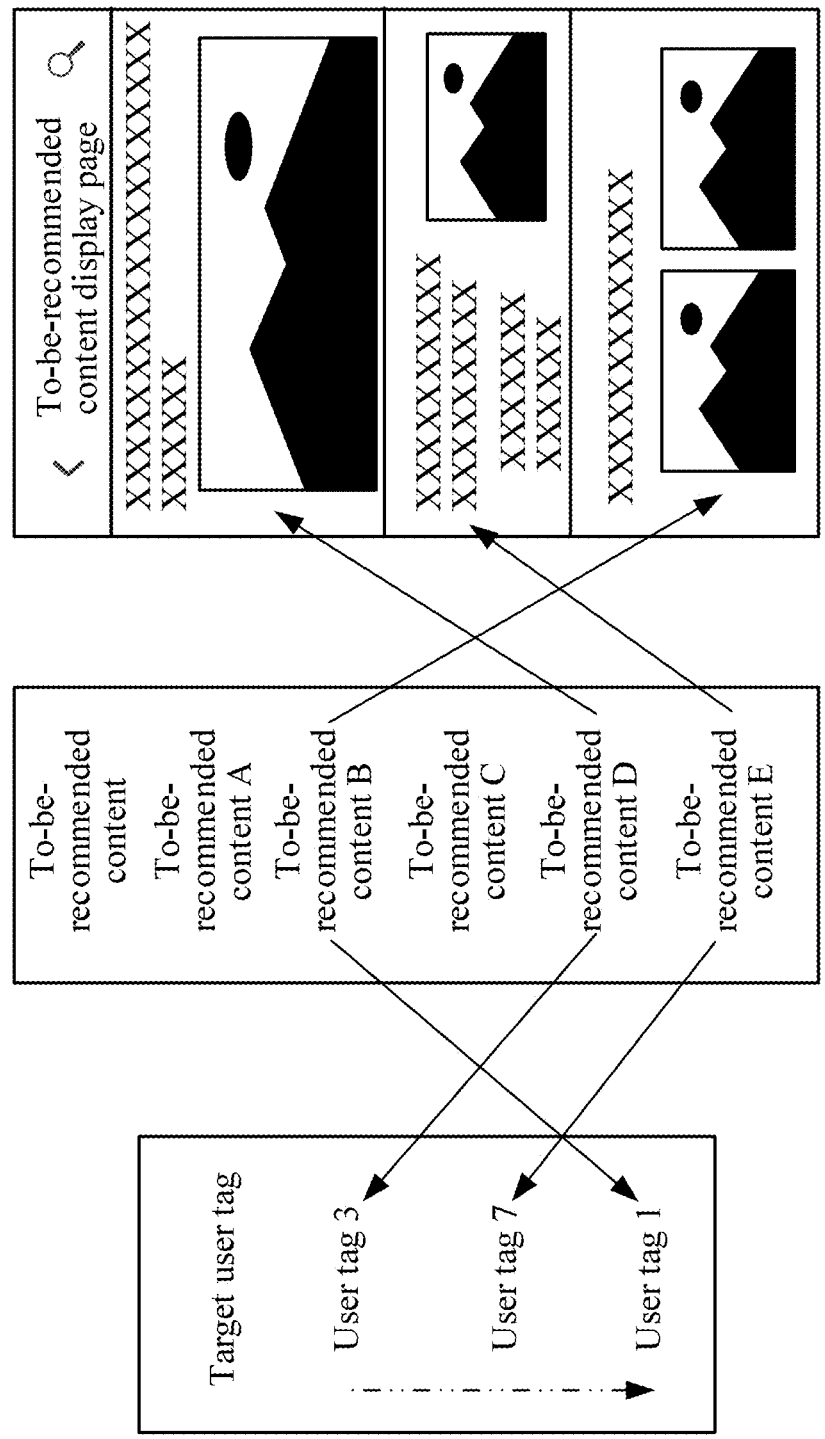
FIG. 6 is a schematic diagram of recommending to-be-recommended content based on a user tag according to an embodiment.

For example, as shown in FIG. 6, it is assumed that target user tags generated by the computer device by using the machine learning model include: a user tag 3, a user tag 7, and a user tag 1. To-be-recommended content obtained by the computer device includes: to-be-recommended content A, to-be-recommended content B, to-be-recommended content C, to-be-recommended content D, and to-be-recommended content E. The to-be-recommended content A corresponds to the user tag 4, the to-be-recommended content B corresponds to the user tag 1, the to-be-recommended content C corresponds to the user tag 12, the to-be-recommended content D corresponds to the user tag 3, and the to-be-recommended content E corresponds to the user tag 7. The user tags corresponding to the to-be-recommended content B, D, and E match the target user tags. Therefore, the to-be-recommended content B, D, and E may be recommended to the target user, and an order of the recommendation is the to-be-recommended content D→the to-be-recommended content E→the to-be-recommended content B. The recommendation order is an order in which the recommended content is to be displayed to the target user.

In the foregoing embodiment, after the target user tags of the target user are generated, applications may be recommended based on the target user tags in a recommendation scenario, thereby improving the accuracy and effectiveness of the recommendation.

Although the steps are displayed sequentially according to the instructions of the arrows in the flowcharts of the embodiments, these steps are not necessarily performed sequentially according to the sequence instructed by the arrows. Unless otherwise explicitly specified in this application, execution of the steps is not strictly limited, and the steps may be performed in other sequences. Moreover, at least a part of the steps in the foregoing embodiments may include a plurality of sub-steps or a plurality of stages. The sub-steps or stages are not necessarily performed at the same moment, but may be performed at different moments. The sub-steps or stages are not necessarily performed successively in order, but may be performed in turn or alternately with at least a part of other steps or sub-steps or stages of other steps.

Figure 7:
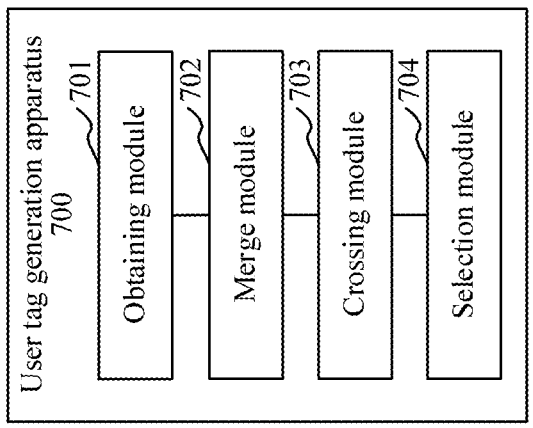
FIG. 7 is a structural block diagram of a user tag generation apparatus according to an embodiment.

As shown in FIG. 7, in an embodiment, a user tag generation apparatus 700 is provided. The apparatus is disposed in a computer device. Referring to FIG. 7, the user tag generation apparatus 700 includes: an obtaining module 701, a merge module 702, a crossing module 703, and a selection module 704.

The obtaining module 701 is configured to obtain discrete user data corresponding to a target user identifier in multiple feature fields respectively.

The merge module 702 is configured to: for each feature field, obtain an intra-field feature corresponding to the target user identifier according to the discrete user data in the feature field, and merge the intra-field features to obtain an inter-field feature corresponding to the target user identifier.

The crossing module 703 is configured to perform feature crossing on sub-features in the inter-field feature to obtain a cross feature corresponding to the target user identifier.

The selection module 704 is configured to select, from candidate user tags, a target user tag corresponding to the target user identifier according to the inter-field feature and the cross feature.

In an embodiment, the merge module 702 is further configured to: input the discrete user data into a machine learning model, the machine learning model including an input layer and an intra-field merge layer; vectorize the discrete user data by using the input layer, to obtain discrete feature vectors corresponding to the discrete user data; and merge the discrete feature vectors in the feature field by using the intra-field merge layer, to obtain an intra-field feature vector corresponding to the feature field and corresponding to the target user identifier.

In an embodiment, the merge module 702 is configured to: respectively obtain an attention distribution weight corresponding to each discrete feature vector in the feature field by using the intra-field merge layer; and perform linear merge on the discrete feature vectors in the feature field according to the corresponding attention distribution weights by using the intra-field merge layer, to obtain the intra-field feature vector corresponding to the feature field and corresponding to the target user identifier.

In an embodiment, the machine learning model further includes an inter-field merge layer. The merge module 702 is further configured to: obtain an attention distribution weight corresponding to each intra-field feature vector by using the inter-field merge layer; and perform linear merge on the intra-field feature vectors according to the corresponding attention distribution weights by using the inter-field merge layer, to obtain an inter-field feature vector corresponding to the target user identifier.

In an embodiment, the machine learning model further includes a feature-cross layer. The crossing module 703 is further configured to: desparsify an inter-field feature vector by using the feature-cross layer, to obtain a densified inter-field feature vector; and perform second-order crossing on sub-features in the densified inter-field feature vector, to obtain the cross feature.

In an embodiment, the crossing module 703 is further configured to: respectively map the sub-features in the inter-field feature vector into hidden layer space vectors in a preset dimension by using the feature-cross layer; use, for any two sub-features in the inter-field feature vector, a product of the two sub-features and the hidden layer space vectors obtained by mapping the two sub-features as a second-order cross feature vector of the two sub-features; and combine the second-order cross feature vectors to obtain a cross feature vector.

In an embodiment, the machine learning model further includes a first FC layer and a second FC layer. The selection module 704 is further configured to: concatenate a cross feature vector and an inter-field feature vector by using the first FC layer after a dimension of the cross feature vector is adjusted to be consistent with a dimension of the inter-field feature vector, to obtain an intermediate feature vector; map the intermediate feature vector into a target feature vector by using the second FC layer; and select the target user tag corresponding to the target user identifier from the candidate user tags according to the target feature vector.

In an embodiment, the machine learning model further includes a prediction layer. The selection module 704 is further configured to: output a correlation score between the target feature vector and a tag vector corresponding to each candidate user tag by using the prediction layer; and select a preset quantity of candidate user tags with top ranking correlation scores as target user tags corresponding to the target user identifier.

Figure 8:
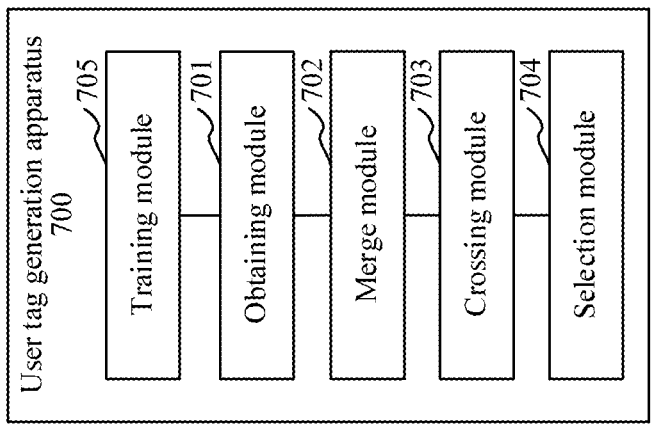
FIG. 8 is a structural block diagram of a user tag generation apparatus according to another embodiment.

As shown in FIG. 8, in an embodiment, the user tag generation apparatus 700 further includes: a training module 705, configured to: collect discrete user data samples respectively corresponding to a sample user identifier in the multiple feature fields; determine training tags of candidate user tags respectively corresponding to the discrete user data samples; input the discrete user data samples into the machine learning model, and output the discrete user data samples and a correlation score sample of a tag vector corresponding to each candidate user tag after the discrete user data samples are sequentially processed by the layers included in the machine learning model; and train the machine learning model according to a difference between the correlation score sample and a corresponding training tag.

In an embodiment, the training module 705 is further configured to: obtain browsing history corresponding to the sample user identifier; query a first candidate user tag corresponding to clicked content in the browsing history and a second candidate user tag corresponding to unclicked content in the browsing history; and set training tags of first candidate user tags respectively corresponding to the discrete user data samples as positive training tags, and set training tags of second candidate user tags respectively corresponding to the discrete user data samples as negative training tags.

In an embodiment, the training module 705 is further configured to: select a reference user identifier different from the sample user identifier and a discrete user data sample corresponding to the reference user identifier; obtain a third candidate user tag corresponding to the positive training tag of the discrete user data sample; and set a training tag of each third candidate user tag as a negative training tag of a discrete user data sample corresponding to the sample user identifier.

Figure 9:
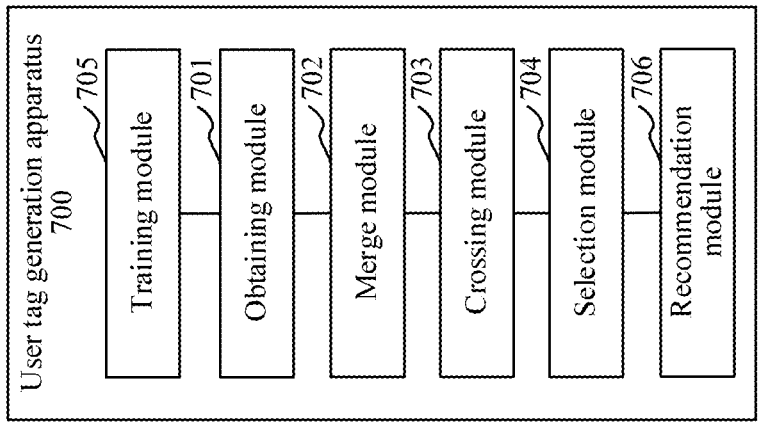
FIG. 9 is a structural block diagram of a user tag generation apparatus according to another embodiment.

As shown in FIG. 9, in an embodiment, the user tag generation apparatus 700 further includes: a recommendation module 706, configured to: obtain multiple pieces of to-be-recommended content; determine a user tag corresponding to each piece of to-be-recommended content; and recommend one of the multiple pieces of to-be-recommended content corresponding to the user tag that matches the target user tag to a terminal corresponding to the target user identifier.

According to the foregoing user tag generation apparatus 700, after discrete user data respectively corresponding to a target user identifier in multiple feature fields is obtained, in an aspect, the discrete user data is merged in the feature fields and between the feature fields, so that sparse behaviors can be adequately merged to obtain an inter-field feature that merges various sparse behaviors. In another aspect, crossing is performed on sub-features in the inter-field feature, so that the sub-features can be adequately merged to obtain a cross feature that merges the sub-features in the inter-field feature. The inter-field feature merges various sparse behaviors, and the cross feature merges the sub-features in the inter-field feature. Therefore, a target user tag corresponding to the target user identifier is selected from candidate user tags according to the inter-field feature and the cross feature, so that the accuracy of generating user tags can be effectively improved.

Figure 10:
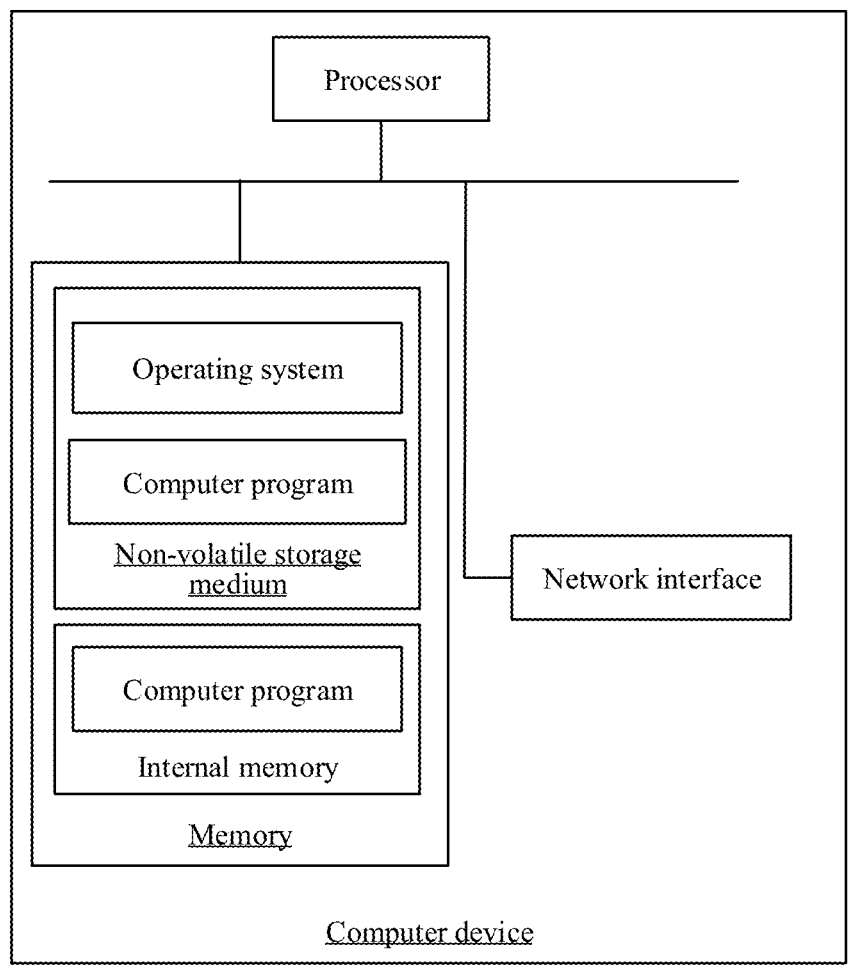
FIG. 10 is a structural block diagram of a computer device according to an embodiment.

FIG. 10 is a diagram of an internal structure of a computer device in an embodiment. The computer device may be the terminal 110 or the server 120 in FIG. 1. As shown in FIG. 10, the computer device includes a processor, a memory, and a network interface connected by a system bus. The memory includes a non-volatile storage medium and an internal memory. The non-volatile storage medium of the computer device stores an operating system, and may further store a computer program. The computer program, when executed by the processor, may cause the processor to implement the user tag generation method. The internal memory may also store a computer program. The computer program, when executed by the processor, may cause the processor to perform the user tag generation method. A person skilled in the art may understand that, the structure shown in FIG. 10 is only a block diagram of a partial structure related to the solution of this application, and does not constitute a limitation to the computer device to which the solution of this application is applied. In some embodiments, the computer device may include more or fewer components than those shown in the figure, or some components may be combined, or a different component deployment may be used.

In an embodiment, the user tag generation apparatus provided in this application may be implemented in the form of a computer program. The computer program may run on the computer device shown in FIG. 10. The memory in the computer device may store program modules constituting the user tag generation apparatus, for example, the obtaining module 701, the merge module 702, the crossing module 703, and the selection module 704 shown in FIG. 7. The computer program formed by the program modules causes the processor to perform the steps in the user tag generation method in the embodiments of this application described in this specification.

For example, the computer device shown in FIG. 10 may obtain discrete user data respectively corresponding to a target user identifier in multiple feature fields by using the obtaining module 701 in the user tag generation apparatus shown in FIG. 7. An intra-field feature corresponding to each feature field and corresponding to the target user identifier according to the discrete user data in the feature field is obtained and the intra-field features are merged to obtain an inter-field feature corresponding to the target user identifier by using the merge module 702. Feature crossing is performed on sub-features in the inter-field feature by using the crossing module 703 to obtain a cross feature. A target user tag corresponding to the target user identifier is selected from candidate user tags according to the inter-field feature and the cross feature by using the selection module 704. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In an embodiment, a computer device is provided, including a memory and a processor, the memory storing a computer program, the computer program, when executed by the processor, causing the processor to perform the steps of the foregoing user tag generation method. The steps of the user tag generation method herein may be the steps of the user tag generation method in the foregoing embodiments.

In an embodiment, a computer-readable storage medium is provided, storing a computer program, the computer program, when executed by a processor, causing the processor to perform the steps of the foregoing user tag generation method. The steps of the user tag generation method herein may be the steps of the user tag generation method in the foregoing embodiments.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a RAM or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A user tag generation method, applicable to a computer device, the method comprising:
obtaining discrete user data corresponding to a target user identifier in multiple feature fields respectively, wherein the discrete user data includes sparse behaviors of the target user associated with the multiple feature fields indicating that a behavior of the target user is less than a predefined threshold;
for each feature field, obtaining an intra-field feature corresponding to the target user identifier according to the discrete user data in the feature field, the obtaining including:
inputting the discrete user data into a machine learning model, the machine learning model comprising an input layer and an intra-field merge layer;
vectorizing the discrete user data by using the input layer, to obtain discrete feature vectors corresponding to the discrete user data; and
merging the discrete feature vectors in the feature field by using the intra-field merge layer, to obtain an intra-field feature vector corresponding to the feature field and corresponding to the target user identifier;
merging multiple intra-field features of the multiple feature fields to obtain an inter-field feature corresponding to the target user identifier;
de-sparsifying an inter-field feature to obtain a densified inter-field feature;
performing feature crossing on sub-features in the densified inter-field feature to obtain a cross feature corresponding to the target user identifier; and selecting, from candidate user tags, a target user tag corresponding to the target user identifier according to the inter-field feature and the cross feature.

2. The method according to claim 1, wherein the merging the discrete feature vectors in the feature field by using the intra-field merge layer, to obtain an intra-field feature vector corresponding to the feature field and corresponding to the target user identifier comprises:
obtaining a weight corresponding to each discrete feature vector in the feature field by using the intra-field merge layer; and
performing linear merge on the discrete feature vectors in the feature field according to the corresponding weights by using the intra-field merge layer, to obtain the intra-field feature vector corresponding to the feature field and corresponding to the target user identifier.

3. The method according to claim 1, wherein the machine learning model further comprises an inter-field merge layer; and
merging the multiple intra-field features of the multiple feature fields to obtain the inter-field feature corresponding to the target user identifier comprises:
obtaining a weight corresponding to each intra-field feature vector by using the inter-field merge layer; and
performing linear merge on the intra-field feature vectors according to the corresponding weights by using the inter-field merge layer, to obtain an inter-field feature vector corresponding to the target user identifier.

4. The method according to claim 1, wherein the machine learning model further comprises a feature-cross layer that is used for de-sparsifying the inter-field feature to obtain the densified inter-field feature; and
performing the feature crossing on the sub-features in the densified inter-field feature to obtain cross feature includes
performing second-order crossing on sub-features in a densified inter-field feature vector, corresponding to the densified inter-field feature, to obtain the cross feature.

5. The method according to claim 4, wherein;
de-sparsifying the inter-field feature vector to obtain the densified inter-field feature vector includes: respectively mapping the sub-features in the inter-field feature vector into hidden layer space vectors in a preset dimension by using the feature-cross layer; and
performing the second-order crossing on the sub-features in the densified inter-field feature vector to obtain the cross feature comprises:
using, for any two sub-features in the inter-field feature vector, a product of the two sub-features and the hidden layer space vectors obtained by mapping the two sub-features as a second-order cross feature vector of the two sub-features; and
combining the second-order cross feature vectors to obtain a cross feature vector.

6. The method according to claim 1, wherein the machine learning model further comprises a first fully connected (FC) layer and a second FC layer; and
selecting the target user tag corresponding to the target user identifier from candidate user tags according to the inter-field feature and the cross feature comprises:
concatenating a cross feature vector and an inter-field feature vector by using the first FC layer after a dimension of the cross feature vector is adjusted to be consistent with a dimension of the inter-field feature vector, to obtain an intermediate feature vector;
mapping the intermediate feature vector into a target feature vector by using the second FC layer; and
selecting the target user tag corresponding to the target user identifier from the candidate user tags according to the target feature vector.

7. The method according to claim 6, wherein the machine learning model further comprises a prediction layer; and
selecting the target user tag corresponding to the target user identifier from the candidate user tags according to the target feature vector comprises:
outputting a correlation score between the target feature vector and a tag vector corresponding to each candidate user tag by using the prediction layer; and
selecting a preset quantity of candidate user tags with top ranking correlation scores as target user tags corresponding to the target user identifier.

8. The method according to claim 1, wherein the method further comprises:
collecting discrete user data samples corresponding to a sample user identifier in the multiple feature fields respectively;
determining training tags of candidate user tags corresponding to the discrete user data samples respectively;
inputting the discrete user data samples into the machine learning model, and outputting the discrete user data samples and a correlation score sample of a tag vector corresponding to each candidate user tag after the discrete user data samples are sequentially processed by the layers comprised in the machine learning model; and
training the machine learning model according to a difference between the correlation score sample and a corresponding training tag.

9. The method according to claim 8, wherein the determining training tags of candidate user tags respectively corresponding to the discrete user data samples comprises:
obtaining browsing history corresponding to the sample user identifier;
querying a first candidate user tag corresponding to clicked content in the browsing history and a second candidate user tag corresponding to unclicked content in the browsing history; and
setting training tags of first candidate user tags respectively corresponding to the discrete user data samples as positive training tags, and setting training tags of second candidate user tags respectively corresponding to the discrete user data samples as negative training tags.

10. The method according to claim 9, wherein the method further comprises:
selecting a reference user identifier different from the sample user identifier and a discrete user data sample corresponding to the reference user identifier;
obtaining a third candidate user tag corresponding to the positive training tag of the discrete user data sample; and
setting a training tag of each third candidate user tag as a negative training tag of a discrete user data sample corresponding to the sample user identifier.

11. The method according to claim 1, wherein the method further comprises:
obtaining multiple pieces of to-be-recommended content;
determining a user tag corresponding to each piece of to-be-recommended content; and recommending one of the pieces of to-be-recommended content corresponding to the user tag that matches the target user tag to a terminal corresponding to the target user identifier.

12. A computer device, comprising a memory and a processor, the memory storing a plurality of computer programs that, when executed by the processor, cause the computer device to perform a plurality of operations including:

obtaining discrete user data corresponding to a target user identifier in multiple feature fields respectively, wherein the discrete user data includes sparse behaviors of the target user associated with the multiple feature fields indicating that a behavior of the target user is less than a predefined threshold;

for each feature field, obtaining an intra-field feature corresponding to the target user identifier according to the discrete user data in the feature field, the obtaining including:

inputting the discrete user data into a machine learning model, the machine learning model comprising an input layer and an intra-field merge layer;

vectorizing the discrete user data by using the input layer, to obtain discrete feature vectors corresponding to the discrete user data; and merging the discrete feature vectors in the feature field by using the intra-field merge layer, to obtain an intra-field feature vector corresponding to the feature field and corresponding to the target user identifier;

merging multiple intra-field features of the multiple feature fields to obtain an inter-field feature corresponding to the target user identifier;

de-sparsifying an inter-field feature to obtain a densified inter-field feature;

performing feature crossing on sub-features in the densified inter-field feature to obtain a cross feature corresponding to the target user identifier; and selecting, from candidate user tags, a target user tag corresponding to the target user identifier according to the inter-field feature and the cross feature.

13. The computer device according to claim 12, wherein the merging the discrete feature vectors in the feature field by using the intra-field merge layer, to obtain an intra-field feature vector corresponding to the feature field and corresponding to the target user identifier comprises:

obtaining a weight corresponding to each discrete feature vector in the feature field by using the intra-field merge layer; and performing linear merge on the discrete feature vectors in the feature field according to the corresponding weights by using the intra-field merge layer, to obtain the intra-field feature vector corresponding to the feature field and corresponding to the target user identifier.

14. The computer device according to claim 12, wherein the plurality of operations further comprise:

collecting discrete user data samples corresponding to a sample user identifier in the multiple feature fields respectively;

determining training tags of candidate user tags corresponding to the discrete user data samples respectively;

inputting the discrete user data samples into the machine learning model, and outputting the discrete user data samples and a correlation score sample of a tag vector corresponding to each candidate user tag after the discrete user data samples are sequentially processed by the layers comprised in the machine learning model; and training the machine learning model according to a difference between the correlation score sample and a corresponding training tag.

15. The computer device according to claim 12, wherein the plurality of operations further comprise:

obtaining multiple pieces of to-be-recommended content;

determining a user tag corresponding to each piece of to-be-recommended content; and recommending one of the pieces of to-be-recommended content corresponding to the user tag that matches the target user tag to a terminal corresponding to the target user identifier.

16. A non-transitory computer-readable storage medium storing a plurality of computer programs that, when executed by a processor of a computer device, cause the computer device to perform a plurality of operations including:

obtaining discrete user data corresponding to a target user identifier in multiple feature fields respectively, wherein the discrete user data includes sparse behaviors of the target user associated with the multiple feature fields indicating that a behavior of the target user is less than a predefined threshold;

for each feature field, obtaining an intra-field feature corresponding to the target user identifier according to the discrete user data in the feature field, the obtaining including:

inputting the discrete user data into a machine learning model, the machine learning model comprising an input layer and an intra-field merge layer;

vectorizing the discrete user data by using the input layer, to obtain discrete feature vectors corresponding to the discrete user data; and merging the discrete feature vectors in the feature field by using the intra-field merge layer, to obtain an intra-field feature vector corresponding to the feature field and corresponding to the target user identifier;

merging multiple intra-field features of the multiple feature fields to obtain an inter-field feature corresponding to the target user identifier;

de-sparsifying an inter-field feature to obtain a densified inter-field feature;

performing feature crossing on sub-features in the inter-field feature to obtain a cross feature corresponding to the target user identifier; and selecting, from candidate user tags, a target user tag corresponding to the target user identifier according to the inter-field feature and the cross feature.

17. The non-transitory computer-readable storage medium according to claim 16, wherein the plurality of operations further comprise:

obtaining multiple pieces of to-be-recommended content;

determining a user tag corresponding to each piece of to-be-recommended content; and recommending one of the pieces of to-be-recommended content corresponding to the user tag that matches the target user tag to a terminal corresponding to the target user identifier.

* * * * *